United States Patent
Li et al.

(10) Patent No.: US 11,590,446 B2
(45) Date of Patent: Feb. 28, 2023

(54) METHODS FOR TREATING A FLUE GAS STREAM USING A WET SCRUBBER UNIT

(71) Applicant: ADA Carbon Solutions, LLC, Littleton, CO (US)

(72) Inventors: Mowen Li, Highlands Ranch, CO (US); Robert B. Huston, Longmont, CO (US); Joseph M. Wong, Castle Pines, CO (US)

(73) Assignee: ADA Carbon Solutions, LLC, Littleton, CO (US)

( * ) Notice: Subject to any disclaimer, the term of this patent is extended or adjusted under 35 U.S.C. 154(b) by 202 days.

(21) Appl. No.: 15/930,145

(22) Filed: May 12, 2020

(65) Prior Publication Data

US 2020/0269186 A1 Aug. 27, 2020

Related U.S. Application Data

(60) Continuation of application No. 16/568,567, filed on Sep. 12, 2019, now Pat. No. 10,682,605, which is a
(Continued)

(51) Int. Cl.
*B01D 53/02* (2006.01)
*B01D 53/14* (2006.01)
(Continued)

(52) U.S. Cl.
CPC ......... *B01D 53/1493* (2013.01); *B01D 53/78* (2013.01); *B01J 20/20* (2013.01);
(Continued)

(58) Field of Classification Search
CPC ........ B01D 2252/60; B01D 2257/2022; B01D 2257/40; B01D 2257/60; B01D 2257/602;
(Continued)

(56) References Cited

U.S. PATENT DOCUMENTS 3,049,449 A 8/1962 Allegrini
3,294,572 A 12/1966 Piccione et al.
(Continued)

FOREIGN PATENT DOCUMENTS

CN 101780955 7/2010
CN 103120893 5/2013
(Continued)

OTHER PUBLICATIONS

U.S. Appl. No. 16/911,161, filed Jun. 24, 2020, Wong et al.
(Continued)

*Primary Examiner* — Christopher P Jones
(74) *Attorney, Agent, or Firm* — Sheridan Ross P.C.

(57) ABSTRACT

Sorbent compositions, comprising a solid sorbent, a dispersive agent, and optionally a capture agent for enhanced wet-Flue Gas Desulfurization (wFGD) or wet scrubber unit function in a flue gas pollutant control stream is disclosed. The sorbent composition may include a sorbent with a dispersive agent, designed to enhance the dispersion of the sorbent in an aqueous sorption liquid of a wet scrubber unit, and therefore may be especially useful in EGU or industrial boiler flue gas streams that include one or more wet scrubber units. The sorbent composition may also include a capture agent useful in sequestering mercury and bromine, as well as other contaminants that may include arsenic, selenium and nitrates.

24 Claims, 9 Drawing Sheets

Related U.S. Application Data division of application No. 15/729,272, filed on Oct. 10, 2017, now Pat. No. 10,421,037, which is a division of application No. 14/696,409, filed on Apr. 25, 2015, now Pat. No. 10,307,706.

(60) Provisional application No. 61/984,165, filed on Apr. 25, 2014.

(51) Int. Cl.
  *B01J 20/20* (2006.01)
  *B01J 20/32* (2006.01)
  *B01D 53/78* (2006.01)

(52) U.S. Cl.
  CPC ....... *B01J 20/3236* (2013.01); *B01D 2252/60* (2013.01); *B01D 2257/2022* (2013.01); *B01D 2257/40* (2013.01); *B01D 2257/60* (2013.01); *B01D 2257/602* (2013.01); *B01D 2258/0283* (2013.01)

(58) Field of Classification Search
  CPC ...... B01D 53/1493; B01D 53/78; B01J 20/20; B01J 20/3236
  See application file for complete search history.

(56) References Cited

U.S. PATENT DOCUMENTS

| | | | |
|---|---|---|---|
| 3,374,608 A | 3/1968 | Manes | |
| 3,557,011 A | 1/1971 | Colombo et al. | |
| 3,873,581 A | 3/1975 | Fitzpatrick et al. | |
| 4,045,553 A | 8/1977 | Mitsumori et al. | |
| 4,306,885 A | 12/1981 | Kober et al. | |
| 4,394,354 A | 7/1983 | Joyce | |
| 5,118,655 A | 6/1992 | Pedersen | |
| 5,460,643 A | 10/1995 | Hansenpusch et al. | |
| 5,534,157 A | 7/1996 | Iman et al. | |
| 5,695,726 A | 12/1997 | Lerner | |
| 5,744,421 A | 4/1998 | Robinson et al. | |
| 5,846,639 A | 12/1998 | Robinson et al. | |
| 5,893,943 A | 4/1999 | Durham et al. | |
| 6,059,860 A | 5/2000 | Larson | |
| 6,251,283 B1 | 6/2001 | Centofanti et al. | |
| 6,309,446 B1 | 10/2001 | Nakanoya et al. | |
| 6,328,939 B1 | 12/2001 | Amrhein | |
| 6,428,677 B1 | 8/2002 | Bonnick et al. | |
| 7,378,372 B2 | 5/2008 | Sylvester | |
| 7,537,695 B2 | 5/2009 | Mitchell et al. | |
| 7,625,537 B2 | 12/2009 | Rader et al. | |
| 7,722,843 B1 | 5/2010 | Srinivasachar | |
| 7,727,307 B2 | 6/2010 | Winkler | |
| 7,790,034 B2 | 9/2010 | Peeters et al. | |
| 7,862,725 B2 | 1/2011 | Mazyek et al. | |
| 8,092,766 B2 | 1/2012 | Ghorishi et al. | |
| 8,361,920 B2 | 1/2013 | Dong | |
| 8,492,509 B2 | 7/2013 | Wang | |
| 8,628,659 B1 | 1/2014 | Taylor, III | |
| 8,663,594 B2 | 3/2014 | Kawamura et al. | |
| 9,314,767 B2 | 4/2016 | McMurray et al. | |
| 9,468,904 B2 | 10/2016 | McMurray et al. | |
| 9,539,538 B2 | 1/2017 | Wong et al. | |
| 9,561,462 B2 | 2/2017 | McMurray et al. | |
| 10,035,126 B2 | 7/2018 | McMurray et al. | |
| 10,137,403 B2 | 11/2018 | McMurray et al. | |
| 10,159,928 B2 | 12/2018 | McMurray | |
| 10,307,706 B2 | 6/2019 | Li et al. | |
| 10,421,037 B2 | 9/2019 | Li et al. | |
| 10,449,492 B2 | 10/2019 | Huston et al. | |
| 10,456,745 B2 | 10/2019 | Huston et al. | |
| 10,682,605 B2 | 6/2020 | Li et al. | |
| 10,730,011 B2 | 8/2020 | Wong et al. | |
| 2002/0018853 A1 | 2/2002 | Khare | |
| 2002/0187082 A1 | 12/2002 | Wu et al. | |
| 2003/0056648 A1 | 3/2003 | Fornai et al. | |
| 2003/0062312 A1 | 4/2003 | Cannon et al. | |
| 2003/0097933 A1 | 5/2003 | Choudary et al. | |
| 2003/0153457 A1* | 8/2003 | Nemoto | B01J 20/3236 96/108 |
| 2004/0003716 A1 | 1/2004 | Nelson | |
| 2004/0009868 A1 | 1/2004 | Mazyck | |
| 2004/0076570 A1 | 4/2004 | Jia | |
| 2005/0000357 A1 | 1/2005 | Simpson | |
| 2005/0084437 A1 | 4/2005 | Cox et al. | |
| 2005/0181931 A1* | 8/2005 | Mouri | B01J 20/28004 502/60 |
| 2006/0067854 A1 | 3/2006 | Andino et al. | |
| 2006/0111007 A1 | 5/2006 | Escaffre et al. | |
| 2007/0051667 A1 | 3/2007 | Martinie et al. | |
| 2007/0107599 A1 | 5/2007 | Hoke et al. | |
| 2007/0254807 A1 | 11/2007 | Bisque et al. | |
| 2007/0259124 A1* | 11/2007 | Luan | B01J 20/28059 428/408 |
| 2008/0226523 A1 | 9/2008 | Mazyck | |
| 2009/0057228 A1 | 3/2009 | Graham et al. | |
| 2010/0316538 A1 | 12/2010 | Buelow et al. | |
| 2011/0059845 A1 | 3/2011 | Fryxell et al. | |
| 2011/0085933 A1 | 4/2011 | Mazyck et al. | |
| 2011/0174743 A1 | 7/2011 | Huang | |
| 2011/0230334 A1 | 9/2011 | Goldberg et al. | |
| 2012/0189761 A1 | 7/2012 | Pentland et al. | |
| 2012/0264221 A1 | 10/2012 | Demmer et al. | |
| 2012/0266752 A1 | 10/2012 | Biermann | |
| 2012/0273431 A1 | 11/2012 | Huang | |
| 2013/0037048 A1 | 2/2013 | Edgington et al. | |
| 2013/0039953 A1 | 2/2013 | Dudnyk et al. | |
| 2013/0087512 A1 | 4/2013 | Ball | |
| 2013/0284673 A1 | 10/2013 | Vaughn et al. | |
| 2013/0306521 A1 | 11/2013 | O'Rear et al. | |
| 2014/0066529 A1 | 3/2014 | Rosenberg et al. | |
| 2014/0186625 A1 | 7/2014 | Wong et al. | |
| 2014/0191157 A1 | 7/2014 | Wong et al. | |
| 2015/0235326 A1 | 8/2015 | Hansen et al. | |
| 2016/0214078 A1 | 7/2016 | Li et al. | |
| 2016/0296908 A1 | 10/2016 | Li et al. | |
| 2017/0043316 A1 | 2/2017 | Li et al. | |
| 2017/0043321 A1 | 2/2017 | Li et al. | |
| 2018/0028970 A1 | 2/2018 | Huston et al. | |
| 2018/0029006 A1 | 2/2018 | Li et al. | |
| 2018/0029008 A1 | 2/2018 | Li et al. | |
| 2018/0029009 A1 | 2/2018 | Li et al. | |
| 2018/0170773 A1 | 6/2018 | Mitchek et al. | |
| 2019/0291041 A1 | 9/2019 | McMurray et al. | |
| 2019/0358578 A1 | 11/2019 | McMurray et al. | |
| 2020/0047107 A1 | 2/2020 | Cayton | |
| 2020/0114311 A1 | 4/2020 | Huston et al. | |
| 2020/0129924 A1 | 4/2020 | Huston et al. | |
| 2021/0188665 A1 | 6/2021 | Mitchek et al. | |
| 2021/0316273 A1 | 10/2021 | Li et al. | |
| 2022/0152578 A1 | 5/2022 | Li et al. | |

FOREIGN PATENT DOCUMENTS

| | | |
|---|---|---|
| EP | 0366836 | 5/1990 |
| EP | 0611071 | 8/1994 |
| EP | 0779880 | 6/1997 |
| EP | 1283192 | 2/2003 |
| EP | 1645543 | 4/2006 |
| EP | 2029148 | 3/2009 |
| EP | 2129623 | 12/2009 |
| EP | 2167432 | 3/2010 |
| EP | 2394737 | 12/2011 |
| EP | 2539275 | 1/2013 |
| WO | WO 9417907 | 8/1994 |
| WO | WO 2007144057 | 12/2007 |
| WO | WO 2008106111 | 9/2008 |
| WO | WO 2009127887 | 10/2009 |
| WO | WO 2010096571 | 8/2010 |
| WO | WO 2010138471 | 12/2010 |
| WO | WO 2010144175 | 12/2010 |
| WO | WO 2011016038 | 2/2011 |
| WO | WO 2011106706 | 9/2011 |
| WO | WO 2012064570 | 5/2012 |
| WO | WO 2013051013 | 4/2013 |

(56) References Cited

FOREIGN PATENT DOCUMENTS

| WO | WO 2013078977 | 6/2013 |
|---|---|---|
| WO | WO 2013136245 | 9/2013 |
| WO | WO 2014032621 | 3/2014 |

OTHER PUBLICATIONS (Author unknown); "Full-Scale WFGD Hg Removal Additive Field Tests"; Babcock & Wilcox Company Power Generation Group; Dec. 13, 2007.
(Author unknown); "Nano-Scale Zero-Valent Iron State of the Technology"; Golder Associates; Jul. 20, 2009.
(Author unknown); "Oxidation Reduction Potential {ORP)/Redox and Free Chlorine"; Application Bulletin; Myron L. Company Water Quality Instrumentation; 2012.
(Author unknown); "Sorbster(TM) Media Adsorption Technology for the Treatment of Selenium and Other Contaminants in Refinery Wastewaters"; MAR Systems; (date unknown).
(Author unknown); "Steam Electric Power Generating Point Source Category: Final Detailed Study Report"; US EPA EPA821-R-09-008; Oct. 2009.
Amrhein; "Fate of Mercury in Wet FGD Wastes"; McDermott Technology; Mar. 19, 2002.
Bach et al.; "Methodologies for Overcoming pH Excursions for Reactivated Granular Activated Carbon: Effect on Adsorption Performance"; Environmental Engineering Science; vol. 24, No. 8; 2007.
Bach et al.; "Strategies for Overcoming pH Excursions for Reactivated Granular Activated Cargon: Air and Carbon Dioxide Treatments"; Environmental Engineering Science; vol. 24, No. 9; 2007.
Bach; "Impact of Surface Chemistry on Adsorption: Tailoring of Activated Carbon"; Dissertation presented to the Graduate School of the University of Florida; 2007.
Baei et al.; Preparation of Polyaniline Nanocomposites for Removal of Sulfate from Water; 2nd Intl_ Conference on Chemistry and Chemical Engineering IPCBEE; vol. 14; pp. 95-100; 2011.
Bao et al.; "Removal of Bromate Ion from Water Using Granular Activated Carbon"; Water Research; vol. 33, No. 13; pp. 2959-2970; 1999.
Blythe et al.; "Bench-Scale Kinetics Study of Mercury Reactions in FGD Liquors-Final Report"; URS Group Cooperative Agreement No. DE-FC26-04NT42314; Aug. 2008.
Blythe et al.; "Investigation of Air Toxics Control by Wet FGD Systems"; URS Power; (date unknown).
Bylina et al.; "Thermal Analysis of Sulphur Impregnated Activated Carbons With Mercury Adsorbed from the Vapour Phase"; Journal of Thermal Analysis and Calorimetry; vol. 96, No. 1; pp. 91-98; 2009.
DeBerry et al.; "Mercury Solutions Bench Scale Kinetics Study of Mercury Reactions in FGD Liquors"; URS Power Technical Paper; Paper No. 47; Sep. 30, 2004.
Ding et al_; "Electrocatalytic Reduction of Bromate Ion Using Polyaniline-Modified Electrode: An Efficient and Green Technology for the Removal of BrO3-in Aqueous Solution"; Elsevier-Eiectrochimica Acta; pp. 8471-8475; 2010.
Du et al.; "Removal of Bromate by Ferrous Sulfate Reduction in Drinking Waler"; Harbin Institute of Technology Schenzhen Graduate School; (date unknown).
Fang et al.; "Supporting Information for Bromate Formation from Bromide Oxidation by the UV/Persulfate Process"; Dept. of Civil & Environmental Engineering, The Hong Kong Univ. of Science & Technology; Clear Water Bay, Kowloon, Hong Kong; {date unknown); 6 pp.
Faria; "Final Report: Selenium Removal from Agricultural Drainage Water: Lab Scale Studies"; Dept. of Water Resources; Sacramento, CA; Agreement No. 4600001985; Dec. 2004.
Farooq et al.; "Removal of Bromate {BrO3-) from Water Using Cationic Surfactant-Modified Powdered Activated Carbon (SM-PAC)"; Separation Science and Technology; vol. 47; pp. 1906-1912; 2012.

Farthing; "Full-Scale Testing of Enhanced Mercury Control Technologies for Wet FGD Systems"; Mercury Control Technology R&D Program Review Meeting; Babcock & Wilcox Company; Aug. 12-13, 2003.
Feeley et al.; "DOE-NETL's Mercury Control Technology R&D Program for Coal-Fired Power Plants"; Mercury Emissions from Coal 1st Int. Experts Workshop-Powerpoint Presentation; May 12-13, 2004.
Graydon et al.; "Sorption and Stability of Mercury on Activated Carbon for Emission Control"; Journal of Hazardous Materials; vol. 168; pp. 978-982; 2009.
Greenlee et al.; "Kinetics of Zero Valent Iron Nanoparticle Oxidation in Oxygenated Water"; Environmental Science & Technology; vol. 46; pp. 12913-12920; 2012.
Huang et al.; "Adsorption/Reduction of Bromate from Drinking Water Using GAC: Effects on Carbon Characteristics and long-Term Pilot Study"; Water SA; vol. 30, No. 3; Jul. 2004.
Huang et al.; "Effect of Characteristics of Activated Carbon on Removal of Bromate"; Separation Purification Technology; vol. 59; pp. 101-107; 2008.
Huang et al.; "Field Demonstration of the Activated Iron Technology for Removing Heavy Metals from Flue-Gas—Desulfurization Wastewater"; Department of Bioiogical and Agricultural Engineering; Texas A&M Univeristy; {date unknown).
Indelicato; Comparison of Zero-Valent Iron and Activated Carbon for Treating Chlorinated Contaminants in Groundwater; Submitted to the Dept. of Civil and Env. Engineering in Partial Fulfillment of the Requirements of the Degree of Master of Eng. At MIT; Jun. 1998.
Jegadeesan et al.; "Comparative Study of Selenite Adsorption on Carbon Based Adsorbents and Activated Alumina"; Environmental Technology; vol. 24; pp. 1049-1059; Dec. 17, 2008.
Jegadeesan et al.; "Selenate Removal from Sulfate Containing Aqueous Solutions"; Environmental Technology; vol. 26; pp. 1181-1187; 2005.
Kirisits et al.; "The Reduction of Bromate by Granular Activated Carbon"; Wat. Res.; vol. 14, No. 17; pp. 4250-4260; 2000.
Konsowa; "Bromate Removal from Water Using Granular Activated Carbon in a Batch Recycle"; Desalination and Water Treatment; vol. 12; pp. 375-381; 2009_.
Kuo et al.; "The Chemistry of Aqueous S(IV)—Fe—O2 System: State of the Art"; Journal of Sulfur Chemistry; vol. 27, No. 5; pp. 461-530; Oct. 2006.
Leesch et al.; "Methyl Bromide Adsorption on Activated Carbon to Control Emissions Form Commodity Fumigations"; Journal of Stored Products Research; vol. 36; pp. 65-74; 2000.
Lin et al.; "Synthesis of New Water-Solube Self-Doped Polyaniline"; Macromolecules; vol. 23; pp. 8117-8118; 2000.
Lu et aL; "Chapter 2—Coupling Agents of Chemical Coupling in Wood Fiber and Polymer Composites: A Review of Coupling Agents and Treatments. Society of Wood Science and Technology State-of-the-Art-Review"; Wood Fiber and Science; vol. 32, No. 1; pp. 88-104; 2000.
Marshall et al.; "Fate of Hg in Synthetic Gypsum Used for Wallboard Production"; EPRI Presentation; (date unknown).
Miller et al.; "Mercury Capture and Fate Using Wet GFD at Coal-Fired Plants"; DOE/NETL Mercury and Wet FGD R&D; Aug. 2006.
Miller et al.; "Mercury Control: Capturing Mercury in Wet Scrubbers: Part I & Part II"; Coal Power {NETL's Environment & Climate Division (ECO)); pp. 22; Jul./Aug. 2007.
Mondal et al.; "Removal of Selenate by Fe and NiFe Nanosized Particles"; Ind. Eng. Chem. Res.; vol. 43; pp. 4922-4934; 2004.
Mueller et al.; "Application of Nanosclae Zero Valent Iron {NZVI) for Groundwater Remediation in Europe"; Environ. Sci. Pollut. Res.; vol. 19; pp. 550-558; Aug. 18, 2011.
Payne et al.; "Absorption of Arsenate and Arsenite by Iron-Treated Activated Carbon and Zeolites: Effects of pH"; Journal of Environmental Science and Health; vol. 40; pp. 723-749; 2005.
Ratpukdi et al.; "Bromate Formation by Ozone-VUV In Comparison with Ozone and Ozone-UV: Effects of pH, Ozone Does, and VUV Power"; Journal of Environmental Engineering; Mar. 2011.

(56) References Cited

OTHER PUBLICATIONS

Redinger; "Mercury Control in Wet FGD Systems on Coal-Fired Utility Boilers"; Babcock & Wilcox; (date unknown).

Richardson et al.; "Presentation-Wet FGD Additives for Enhanced Mercury Control"; Southern Co. Luminant, NETL, AES, Nalco, Degussa, URS, EPRI; (date unknown).

Richardson; "Mercury Stability in FGD Byproducts"; URS Corporation-EPRI; (date unknown).

Sanchez-Polo et al.; "Removal of Bromide and Iodide Ions from Drinking Water by Silver-Activated Carbon Aerogels"; Journal of Colloid and Interface Science; vol. 300; pp. 437-441; 2006_.

Schroeder et al.; "Leach Testing of FGD Materials"; DOE/NETL Mercury Control Technology Conference; Dec. 11-13, 2006.

Stokee et al.; "Development of a Regenerable System Employing Silica-Titania Composites for the Recovery of Mercury from End-Box Exhaust at a Chlor-Alkali Factory"; Air & Waste Manage. Assoc.; vol. 58; pp. 530-547; Apr. 2008.

Stokke et al.; "Photocatlytic Degradation of Methanol Using Silica-Titania Composite Pellets: Effect of Pore Size on Mass Transfer and Reaction Kinetics"; Environmental Science & Technology; vol. 42, No. 10; pp. 3808-3813; 2008.

Suslow; "Oxidation-Reduction Potential {ORP) for Water Disinfection Monitoring, Control, and Documentation"; Publication 8149, University of California; 2004.

Wang et al.; "Removal of Bromate Ion Using Powdered Activated Carbon"; Journal of Environmental Sciences; vol. 22, No. 12; pp. 1846-1853;2010.

Wu et al; "Study of Elemental Mercury Re-Emission Through a Lab-Scale Simulated Scrubber"; Fuel; vol. 89; pp. 2072-2080; 2010.

Yang et al.; "Modification of Activated Carbon by Polyaniline for Enhanced Adsorption of Aqueous Arsenate"; Ind. En._ Chem. Res.; vol. 46; pp. 2133-2140; 2007.

Zehavi et al.; "The Oxidation of Aqueous Bromide Ions by Hydroxyl Radicals. A Pulse Radiolytic Investigation"; The Journal of Physcial Chemistry; vol. 76, No. 8; 1972.

Zuhairi et al.; "Development of Nano-Zero Valent Iron for the Remidiation of Contaminated Water"; Chemical Engineering ransations; vol. 28; pp. 25-30; 2012.

Official Action for U.S. Appl. No. 14/696,409, dated Jul. 12, 2017 6 pages, Restriction Requirement.

Official Action for U.S. Appl. No. 14/696,409, dated Dec. 14, 2017 13 pages.

Notice of Allowance for U.S. Appl. No. 14/696,409, dated Oct. 11, 2018 7 pages.

Notice of Allowance for U.S. Appl. No. 14/696,409, dated Jan. 31, 2019 6 pages.

Official Action for U.S. Appl. No. 15/729,272, dated Feb. 13, 2018 6 pages, Restriction Requirement.

Official Action for U.S. Appl. No. 15/729,272, dated Oct. 26, 2018 10 pages.

Notice of Allowance for U.S. Appl. No. 15/729,272, dated May 14, 2019 5 pages.

Notice of Allowance for U.S. Appl. No. 16/568,567, dated Feb. 3, 2020 7 pages.

U.S. Appl. No. 17/559,892, filed Dec. 22, 2022, Li et al.

U.S. Appl. No. 17/705,648, filed Mar. 28, 2022, Li et al.

* cited by examiner

METHODS FOR TREATING A FLUE GAS STREAM USING A WET SCRUBBER UNIT

CROSS-REFERENCE TO RELATED APPLICATIONS

This application claims the priority benefit as a continuation application of U.S. patent application Ser. No. 16/568,567, filed on Sep. 12, 2019, now U.S. Pat. No. 10,682,605, which is a divisional application of U.S. patent application Ser. No. 15/729,272 filed on Oct. 10, 2017, now U.S. Pat. No. 10,421,037 which is a divisional application of U.S. patent application Ser. No. 14/696,409 filed on Apr. 25, 2015, now U.S. Pat. No. 10,307,706, which claims the priority benefit under 35 U.S.C. § 119(e) of U.S. Provisional Application Ser. No. 61/984,165, filed on Apr. 25, 2014. Each of these prior applications is incorporated herein by reference in its entirety.

FIELD

This disclosure relates to sorbent compositions having capability to enter, disperse and remain suspended in an aqueous sorption liquid of a wet-Flue Gas Desulfurization (wFGD) unit (i.e., a wet scrubber unit) of a flue gas stream emission control system and also relates to contaminant removal from the wet scrubber unit.

BACKGROUND

Mercury (Hg) is a highly toxic compound and exposure at appreciable levels can lead to adverse health effects for people of all ages, including harm to the brain, heart, kidneys, lungs, and immune system. Mercury is naturally occurring but is also emitted from various human activities, such as burning fossil fuels and other industrial processes. For example, in the United States about 40% of the mercury introduced into the environment comes from coal-fired power plants.

In the United States and Canada, federal and state/provincial regulations have been implemented or are being considered to reduce mercury emissions, particularly from coal-fired power plants, steel mills, cement kilns, waste incinerators and boilers, industrial coal-fired boilers, and other coal combusting facilities. For example, the United States Environmental Protection Agency (U.S. EPA) has promulgated Mercury Air Toxics Standards (MATS) which would, among other things, require coal-fired power plants to capture approximately 90% of their mercury emissions beginning in 2015.

The leading technology for mercury control from coal-fired power plants is activated carbon injection (ACI). ACI involves the injection of sorbents, particularly powdered activated carbon (PAC), into flue gas emitted by the boiler of a power plant. PAC is a porous carbonaceous material having a high surface area, which exposes significant amounts of beneficial chemically functional and catalytic reaction sites, creating high adsorptive potential for many compounds, including capturing mercury from the flue gas.

ACI technology has shown the potential to control mercury emissions in most coal-fired power plants, even those plants that may achieve some mercury control through control devices that are primarily designed for the capture of other pollutants, such as wet or dry scrubbers used to capture sulfur dioxide ($SO_2$) and other acid gases from the flue gas stream. Acid gases and acid gas precursors in the flue gas stream typically come from three primary sources. The first is the coal feedstock fed to the boiler. Certain types of coal inherently have high concentrations of sulfur, nitrogen, chlorine, or other compounds which can form acid gases in the flue gas. For example, coals such as Illinois Basin coal with high sulfur content (e.g., above about 0.5%) are becoming more common as a boiler feedstock for economic reasons, as high sulfur coals tend to be cheaper than low sulfur coals. A second source is the selective catalytic reduction (SCR) step for controlling emissions of NON. An unintended consequence of this process is that $SO_2$ in the flue gas can be oxidized to form $SO_3$. A third source is that the power plant operator may inject $SO_3$ into the flue gas stream to enhance the efficiency of the particulate removal devices, e.g., to avoid opacity issues and increase the effectiveness of an electrostatic precipitator (ESP) in removing particulates from the flue gas stream.

Flue-gas desulfurization (FGD) is a set of technologies used to remove sulfur dioxide from exhaust flue gases of coal-fired power plants. One of the common methods is to use a wet flue-gas desulfurization (wFGD) unit (i.e., a wet scrubber unit) that uses a slurry of a calcium-based or sodium-based alkaline compound, usually limestone or lime. Contacting the flue gas with the slurry scrubs (i.e., removes) contaminants from the flue gas, forming calcium sulfite or sodium sulfite. In FGD systems utilizing forced oxidation, the corresponding sulfites are converted to sulfate byproducts that are collected while the scrubbed flue gas is emitted. The wet scrubber units have also been shown to be co-beneficial with respect to the removal of mercury. The wet scrubber unit is often the last emission control equipment before the stack, so it is critical to ensure that mercury capture is achieved in or before the wet scrubber unit.

According to the U.S. EPA sixty-nine percent of coal-fired capacity will be wet scrubbed by 2025, indicating a huge need for emission control in the wet scrubber unit. Mercury control additives may also be utilized in wet scrubber units, and may include sulfur-based compounds that can tightly bond with mercury to form mercury sulfide. However, a large amount of the additive (e.g., 1:1 to mercury) is typically required to achieve a high removal rate of mercury, adding to the cost of emission control. Additionally, sulfur-based additives only work well for mercury capture in low oxidation-reduction potential (ORP) environments, or may even bring the ORP down, which can cause the acid gas capture in the wet scrubber unit to be less effective.

In addition to mercury emission, stringent regulations in regards to emission of other contaminants, such as selenium, arsenic, nitrates, and bromine, have been proposed. In a forced-oxidation wet scrubber unit, selenium exists as selenite ($SeO_3^{2-}$) or selenate ($SeO_4^{2-}$), depending on the ORP in the aqueous phase. Selenate is more difficult to capture than selenite, due to its higher water solubility. Halogens such as bromine, which may be in the form of a bromide compound such as calcium bromide, are often used to enhance mercury capture in the flue gas stream by adding the bromide compound to the combustible material (e.g., coal) or directly to the flue gas stream, resulting in bromine build-up in the aqueous sorption liquid of the wet scrubber unit. Therefore, it may be necessary to monitor bromine levels in the wet scrubber unit. Although bromine in oxidized forms, e.g., bromine ($Br_2$), bromate ($BrO_3^{2-}$), etc. can be easily adsorbed by PAC, in low ORP conditions, the bromine exists as bromide ($Br^-$) and therefore may not be readily captured by PAC. The wet scrubber unit serves as the last opportunity to capture target emission compounds such as mercury, selenium, arsenic and bromine, as well as potentially arsenic and nitrates. Therefore, effective capture of these and other contaminants in the wet scrubber unit is crucial.

SUMMARY OF THE INVENTION

The use of activated carbon as a sorbent in wet scrubber units has been proposed, but such use has been limited as activated carbon tends to stay at the air-water interface in the wet scrubber unit and creates a foam, preventing the activated carbon from dispersing well in the aqueous sorption liquid. As a result, the efficacy of the activated carbon for the removal and sequestration of contaminants such as mercury from the aqueous sorption liquid is limited.

Other wet scrubber unit additives for mercury capture, such as sulfur-based compounds, may be expensive and/or unsuccessful at sequestering mercury from the wet scrubber units. Further, sulfur-based compounds may limit the ability of the wet scrubber unit to capture acid gases, such as $SO_2$, by lowering the ORP. Prior art activated carbon sorbents may be ineffective at mercury capture within the wet scrubber unit due to their limited ability to disperse in the aqueous sorption liquid contained in the wet scrubber unit due to the hydrophobic surface characteristics of the solid sorbent.

It would be advantageous to provide a sorbent composition which overcomes the limitations of conventional sorbents by modifying the solid sorbent such that the solid sorbent can effectively enter into and disperse within the aqueous sorption liquid of a wet scrubber unit and remain suspended therein to more efficiently capture and remove contaminants such as mercury, bromine/bromide, selenium, arsenic, and/or nitrate from the wet scrubber unit.

In one embodiment of the present disclosure, a sorbent composition for enhanced wet scrubber unit function is provided, i.e., for improved performance of a wFGD unit. The sorbent composition includes a solid sorbent and a dispersive agent, where the dispersive agent is selected to cause the solid sorbent to more readily enter into and disperse within the aqueous sorption liquid contained in the wet scrubber unit.

A number of characterizations, refinements and additional features are applicable to this embodiment. These characterizations, refinements and additional features are applicable to this embodiment of a sorbent composition individually or in any combination.

In one characterization of the sorbent composition, the dispersive agent is selected from the group consisting of dispersants, deflocculants, surfactants, coupling agents and mixtures thereof. In one particular refinement, the dispersive agent comprises a dispersant, and in a further refinement the dispersive agent comprises a polymeric dispersant. In another refinement, the dispersive agent comprises a deflocculant, and in yet a further refinement, the dispersive agent is a phosphate salt. In one particular refinement, the phosphate salt comprises tri-sodium phosphate. In another refinement, the sorbent composition comprises at least about 0.05 wt. % of the tri-sodium phosphate salt. In another refinement, the tri-sodium phosphate is coated onto the solid sorbent.

In another refinement of the sorbent composition, the dispersive agent comprises a surfactant. In yet another refinement, the dispersive agent comprises a coupling agent.

In another characterization of the sorbent composition, the solid sorbent comprises a carbonaceous sorbent, such as powdered activated carbon (PAC).

In other characterizations of the sorbent composition, the sorbent composition comprises additional components. In one particular characterization, the sorbent composition further comprises a capture agent. In one refinement, the capture agent is selected from the group consisting of peroxides, persulfates, silver compounds and mixtures thereof. In one particular refinement, the capture agent comprises ammonium persulfate. In another particular refinement, the capture agent comprises a silver compound, such as a silver salt. In another particular refinement, the silver salt comprises silver nitrate. In yet another refinement, the capture agent comprises a metal or a metal-containing compound, such as a metal or metal-containing compound comprising a metal that is selected from the group consisting of calcium, iron, and mixtures thereof. In one refinement of the capture agent, the capture agent is selected to capture and remove contaminants from the flue gas stream and/or from the aqueous sorption liquid of the wet scrubber unit, the contaminants selected from the group consisting of mercury, arsenic, selenium, nitrate, and bromine.

In certain embodiments, the sorbent composition may also be characterized by its capability to enter an aqueous sorption liquid of a wet scrubber unit. In one refinement, the time needed for the sorbent composition to wet and enter an aqueous sorption liquid of a wet scrubber unit is not greater than about 50% of the time needed for the untreated solid sorbent (i.e., a composition consisting essentially of or consisting of the solid sorbent) to enter the aqueous sorption liquid. In a further refinement, the time needed for the sorbent composition to wet and enter an aqueous sorption liquid of a wet scrubber unit is not greater than about 70% of the time needed for the untreated solid sorbent to wet and enter the aqueous sorption liquid. In yet a further refinement, the time needed for the sorbent composition to wet and enter an aqueous sorption liquid of a wet scrubber unit is not greater than about 90% of the time needed for the untreated solid sorbent to enter the aqueous sorption liquid.

In another embodiment of the present disclosure, a method for removing contaminants from a flue gas stream is provided. In this embodiment, the method comprises the steps of burning a combustible material, the burning creating a flue gas stream containing contaminants, adding a sorbent composition to the flue gas stream, capturing the sorbent composition from the flue gas stream with an aqueous sorption liquid contained in a wet scrubber unit, wherein the sorbent composition sequesters contaminants from the aqueous sorption liquid. The sorbent composition may be the sorbent composition described above, including any combination of the various refinements and additional features. When the sorbent composition is captured by the aqueous sorption liquid in the wet scrubber unit, the sorbent composition may advantageously enter the aqueous sorption liquid (e.g., the sorbent composition is wetted by the aqueous sorption liquid) and the sorbent composition may disperse within the aqueous sorption liquid to enhance the ability of the solid sorbent to capture and sequester contaminants from the aqueous sorption liquid.

A number of characterizations, refinements and additional features are applicable to this method of removing contaminants from a flue gas stream. These characterizations, refinements and additional features are applicable to this embodiment of a method for removing contaminants from a flue gas stream, individually or in any combination.

In one characterization, the method comprises the further step of adding a second sorbent composition to the aqueous sorption liquid contained in the wet scrubber unit. The second sorbent composition may be the same sorbent composition as the first sorbent composition, or may be a different sorbent composition, (e.g., having one or more different characteristics.)

In another embodiment of the present disclosure, another method for removing contaminants from a flue gas stream is disclosed. The method includes the steps of burning a combustible material to create a flue gas stream containing contaminants, adding a sorbent composition to an aqueous sorption liquid contained in a wet scrubber unit, wherein the sorbent composition enters the aqueous sorption liquid contained in the wet scrubber unit with substantially no foaming at the surface of the aqueous sorption liquid and wherein the sorbent composition disperses well within the sorption liquid, and sequestering by the sorbent composition of contaminants from the aqueous sorption liquid. The sorbent composition may be the sorbent composition described above, including any combination of the various refinements and additional features.

In another embodiment, a further method for removing contaminants from a flue gas stream is provided. The method includes the steps of burning a combustible material to create a flue gas stream containing contaminants, adding a sorbent composition to a flue gas stream, and sequestering by the sorbent composition of contaminants. The sorbent composition may be the sorbent composition described above, including any combination of the various refinements and additional features.

In yet another embodiment, a wet scrubber unit is disclosed. The wet scrubber unit is disposed in a flue gas train, and the wet scrubber unit contains an aqueous sorption liquid, wherein the aqueous sorption liquid comprises water, an alkaline compound dispersed in the water, a solid sorbent, and a dispersive agent, wherein the solid sorbent is dispersed throughout the aqueous sorption liquid.

A number of characterizations, refinements and additional features are applicable to this embodiment of a wet scrubber unit. These characterizations, refinements and additional features are applicable to this embodiment of a method for removing contaminants from a flue gas stream, individually or in any combination.

In one characterization, the alkaline compound comprises limestone. In another characterization, the solid sorbent comprises a carbonaceous sorbent. In a particular refinement of this characterization, the carbonaceous sorbent comprises activated carbon. In another characterization, the dispersive agent is selected from the group consisting of dispersants, deflocculants, surfactants, wetting agents, coupling agents and mixtures thereof. In one particular refinement of this characterization, the dispersive agent comprises a deflocculant. In another refinement of this characterization, the dispersive agent comprises a phosphate salt. In yet another refinement, the phosphate salt comprises tri-sodium phosphate.

This embodiment of a wet scrubber unit may also include additional features. For example, in one characterization, the aqueous sorption liquid also comprises a capture agent. For example, in one characterization the capture agent is selected from the group consisting of peroxides, persulfates, silver compounds and mixtures thereof. In one particular characterization, the capture agent comprises ammonium persulfate. In another particular characterization, the capture agent comprises a silver compound, such as a silver salt. In one refinement of this characterization, the silver salt comprises silver nitrate.

DETAILED DESCRIPTION

Figure 1:
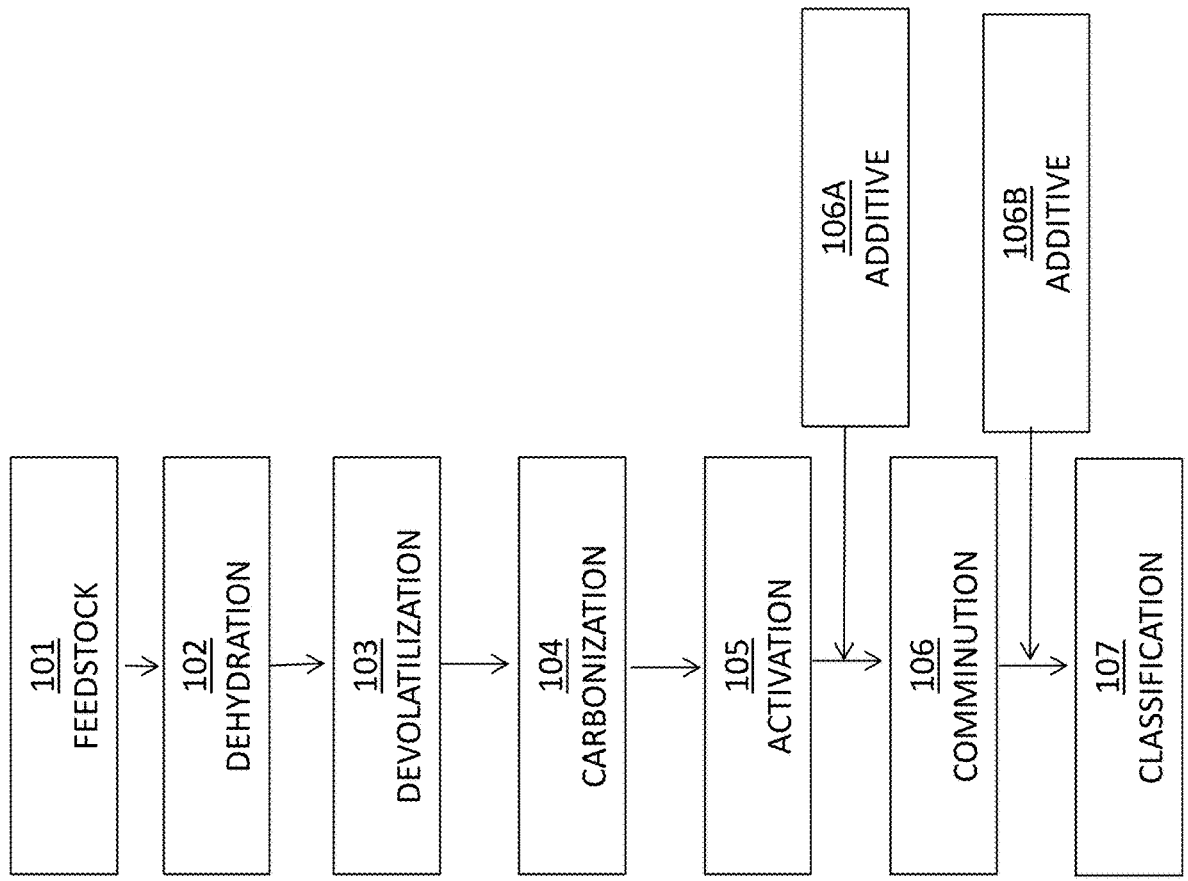
FIG. 1 illustrates a flow sheet for the manufacture of a sorbent composition.

While the use of solid sorbents such as activated carbon in a wet scrubber unit (e.g., in the aqueous sorption liquid of a wet scrubber unit) has been proposed, the use of solid sorbents in this manner has met with limited success. It is believed that this limited success is due, at least in part, to the foaming that commonly occurs at the interface between the liquid and the air when the solid sorbent is added to the wet scrubber liquid. It is believed that this foaming may hinder the ability of the solid sorbent to enter, disperse, and remain suspended in the aqueous sorption liquid (e.g., in a lime slurry) that is used to capture $SO_2$ in the wet scrubber unit. It is believed that the inability of the solid sorbent to enter, disperse and remain suspended in the aqueous sorption liquid inhibits the ability of the solid sorbent to effectively remove contaminants from the wet scrubber unit such as mercury (Hg).

It would be advantageous to provide a sorbent composition which mitigates some of the limitations of conventional sorbents when used in a wet scrubber unit. According to the present disclosure, such limitations may be mitigated by modifying a solid sorbent such that the solid sorbent can effectively enter into and disperse within the aqueous sorption liquid and remain suspended therein to more efficiently capture and remove contaminants such as mercury, bromine/bromide, selenium, arsenic, and/or nitrate from the wet scrubber unit.

According to one embodiment, to facilitate contaminant removal by the solid sorbent in an aqueous sorption liquid, the sorbent composition may comprise a solid sorbent and a dispersive agent. The solid sorbent may be any material that may adsorb, absorb or otherwise attract molecules to its surface typically due to the sorbent having a high surface area. Solid sorbents may include aluminum oxides, silica, polypropylene fibers, cellulosic fibers, zeolite, molecular sieves, and/or carbonaceous sorbents. In one characterization, the solid sorbent comprises a carbonaceous sorbent such as an activated carbon. Powdered activated carbon (PAC) may be particularly effective as the solid sorbent.

Various embodiments of a sorbent composition are provided that are particularly useful when placed (e.g., injected)

into a wet scrubber unit (e.g., into the aqueous sorption liquid of a wet scrubber unit) that is used in a flue gas treatment train to treat a flue gas stream (e.g., from a coal-burning boiler or a waste to energy boiler) to rapidly and efficiently capture and remove contaminants, such as mercury, from the flue gas stream. The sorbent composition may be added to the aqueous sorption liquid by adding the sorbent composition to the flue gas stream (i.e., contacting the sorbent composition with the flue gas stream) at a location upstream of the wet scrubber unit, and/or may be added to the wet scrubber unit independently, i.e., independent from the flue gas stream. In this regard, the sorbent composition may advantageously be wetted by and enter the aqueous sorption liquid in the wet scrubber unit to recover sufficient amounts of mercury to meet mercury removal criteria, such as applicable government regulations, and to possibly remove and sequester other contaminants from the aqueous sorption liquid.

In some embodiments, the solid sorbent may have various beneficial physical attributes such as a relatively small particle size, a high surface area and a well-controlled pore size distribution. Such characteristics may be particularly advantageous when the sorbent composition is injected into the flue gas stream before the flue gas stream enters the wet scrubber unit.

For example, the solid sorbent may have a median particle size of not greater than about 100 micron, such as not greater than about 75 micron, such as not greater than about 50 micron, such as not greater than about 30 micron, or even not greater than about 15 micron. Characterized in another way, the median particle size may be at least about 5 micron, such as at least about 6 micron or even at least about 8 micron. The D50 median particle size may be measured using techniques such as light scattering techniques (e.g., using a Saturn DigiSizer II, available from Micromeritics Instrument Corporation, Norcross, Ga.). A relatively small median particle size, such as not greater than about 15 micron, means greater surface area per volume of the solid sorbent. The increased surface area may result in many benefits, including, but not limited to, increased exposure of the mercury to chemical species (e.g., elements or compounds) disposed on the solid sorbent surface, increased area available for reactions to occur, and thus overall improved reaction kinetics, particularly when the sorbent composition is entrained in the flue gas stream before entering the wet scrubber unit.

In another characterization, the solid sorbent has a relatively high surface area. For example, the solid sorbent may have a surface area of at least about 350 m$^2$/g, such as at least about 400 m$^2$/g or even at least about 500 m$^2$/g. Surface area may be calculated using the Brunauer-Emmett-Teller (BET) theory that models the physical adsorption of a monolayer of nitrogen gas molecules on a solid surface and serves as the basis for an analysis technique for the measurement of the specific surface area of a material. BET surface area may be measured using the Micromeritics TriStar II 3020 (Micromeritics Instrument Corporation, Norcross, Ga.).

In one example, a solid sorbent comprises PAC with a median particle size or D50 of about 25 micron, and is measured to have a surface area in the range of from about 480 to about 600 m$^2$/g. In another example, a solid sorbent comprises PAC with a D50 of about 10 micron, and is measured to have a surface area in the range of from about 440 to about 570 m$^2$/g.

The solid sorbent may also have a high pore volume and a well-controlled distribution of pores, particularly among the mesopores (i.e., from 20 Å to 500 Å width) and the micropores (i.e., not greater than 20 Å width). A well-controlled distribution of micropores and mesopores is desirable for effective removal of mercury from the flue gas stream. While not wishing to be bound by any theory, it is believed that the mesopores are the predominant structures for capture and transport of the oxidized mercury species to the micropores, whereas micropores are the predominate structures for sequestration of the oxidized mercury species.

In this regard, the sum of micropore volume plus mesopore volume of the solid sorbent may be at least about 0.10 cc/g, such as at least 0.20 cc/g, and at least about 0.25 cc/g or even at least about 0.30 cc/g. The micropore volume of the solid sorbent may be at least about 0.10 cc/g, such as at least about 0.15 cc/g. Further, the mesopore volume of the solid sorbent may be at least about 0.10 cc/g, such as at least about 0.15 cc/g. In one characterization, the ratio of micropore volume to mesopore volume may be at least about 0.7, such as 0.9, and may be not greater than about 1.5. Such levels of micropore volume relative to mesopore volume advantageously enable efficient capture and sequestration of oxidized mercury species by the solid sorbent. Pore volumes may be measured using gas adsorption techniques (e.g., $N_2$ adsorption) using instruments such as a TriStar II Surface Area Analyzer (Micromeritics Instruments Corporation, Norcross, Ga., USA).

The solid sorbent may comprise a porous carbonaceous sorbent material (e.g., fixed carbon) that is adapted to provide a large surface area in the appropriate pore size to sequester contaminants from the aqueous sorption liquid such as mercury, bromine, selenium, etc. For example, the solid sorbent may include at least about 10 weight percent fixed carbon, such as at least about 15 weight percent or even at least about 20 weight percent fixed carbon. In some characterizations, the fixed carbon content of the solid sorbent may not exceed about 95 weight percent, such as not greater than about 85 weight percent, such as not greater than about 75 weight percent, such as not greater than about 60 weight percent, or such as not greater than about 55 weight percent fixed carbon. Due to a well-controlled pore structure and the presence of the other components in the solid sorbent, a relatively low amount of fixed carbon may be required for sequestration of contaminants.

Another component of the solid sorbent may be in the form of minerals. In one characterization, such minerals may be native to the feedstock from which the carbonaceous solid sorbent is formed (e.g., by activation). In another characterization, some portion of the minerals may be separately added to the solid sorbent, which requires additional expense. While not wishing to be bound by any theory, it is believed that such minerals may advantageously facilitate the oxidation of the elemental mercury in the flue gas stream if the solid sorbent is injected into the flue gas stream ahead of the wet scrubber unit. The presence of such minerals may thereby enhance the kinetics of the mercury oxidation such that a reduced contact time with the flue gas stream is required to oxidize and remove mercury from the flue gas stream as compared to sorbent compositions without such minerals.

The minerals may advantageously be selected from minerals including, but not limited to, aluminum-containing minerals, calcium-containing minerals, iron-containing minerals, silicon-containing minerals (e.g., silicates), sodium-containing minerals, potassium-containing minerals, zinc-containing minerals, tin-containing minerals, magnesium-containing minerals, and combinations thereof. The minerals may predominantly be oxide-based minerals, such as metal oxide minerals (e.g., $CaO$, $Fe_2O_3$, $Fe_3O_4$, $FeO$, Al$_2$O$_3$), and silicates (e.g., Al$_2$SiO$_5$). In one characterization, the minerals predominantly include metal oxides, particularly aluminum oxides and iron oxides. In another characterization, the minerals include calcium-containing minerals, iron-containing minerals and/or aluminosilicates. These types of minerals are well adapted to catalyze the oxidation reaction of the mercury. Iron-containing minerals are particularly well adapted to catalyze the oxidation reaction, and in one characterization, the minerals include at least 1 wt. % iron-containing minerals. The minerals may be intimately intertwined within the sorbent composition within a well-controlled porous structure that facilitates the oxidation, capture and removal of mercury. Such minerals, particularly iron-containing minerals and calcium containing minerals, may also facilitate the sequestration of contaminants (e.g., selenium) in the wet scrubber unit. The presence of elemental iron and/or elemental calcium (e.g., metallic iron and/or calcium) may also facilitate the sequestration of contaminants such as selenium and arsenic in the wet scrubber unit.

In one characterization, the solid sorbent may include at least about 20 weight percent (wt. %) of the minerals, such as at least about 25 wt. % and even at least about 30 wt. % of the minerals. However, excessive amounts of the minerals may be detrimental to the capture of mercury. In this regard, the solid sorbent may include not greater than about 50 wt. % of the minerals, such as not greater than about 45 wt. % of the minerals. Advantageously, the solid sorbent may include not greater than about 40 wt. % of the minerals, such as not greater than about 35 wt. % minerals. The total mineral content may be measured by a TGA701 Thermal-gravimetric Analyzer (LECO Corporation, St. Joseph, Mich.). The specific types and amount of particular minerals may be measured by the Niton XL3t X-Ray Fluorescence (XRF) Analyzer (Thermo Fisher Scientific Inc., Waltham, Mass.).

In accordance with the present disclosure, the sorbent composition includes a solid sorbent, e.g., as described above, and also includes a dispersive agent, e.g., an effective amount of a dispersive agent to increase the wettability and/or the dispersion of the solid sorbent in the aqueous sorption liquid. The sorbent composition may include other components that may be added to the sorbent composition and/or that may be integrally formed when producing the solid sorbent.

The sorbent composition may have additional beneficial surface chemistry characteristics, particularly when the sorbent composition is contacted with the flue gas before contacting the wet scrubber unit. For example, flue gas is typically acidic. When sequestering metals such as mercury in an acidic environment, it is advantageous to solubilize the metal prior to capture, which often requires specific ionic conditions. In this regard, the sorbent composition may have a basic surface pH of greater than about 8 and not greater than about 12. Such basic surface chemistry may be inherent to the solid sorbent (e.g., a result of the manufacturing process), or the sorbent composition may comprise an additive in the form of a base that is capable of neutralizing acidic components in the flue gas.

Moreover, the sorbent composition may also include an amount of aqueous-based solubilizing medium such as water, particularly when the sorbent composition is contacted with the flue gas before contacting the wet scrubber unit. An aqueous-based solubilizing medium can combat the acidity of the flue gas, enhance the mass diffusional kinetics of mercury oxidation and sequestration reactions by solubilizing oxidized mercury species within the pore structure, and prevent captured mercury from re-solubilizing and reentering the flue gas. In this regard, the sorbent composition may include at least about 2 wt. % of the solubilizing medium, such as at least about 3 wt. % or at least about 6 wt. % of the aqueous-based solubilizing medium. However, the amount of solubilizing medium in the sorbent composition should be not greater than about 12 wt. %, such as not greater than about 10 wt. % to avoid interfering with the mercury oxidation reaction(s) and consuming carbon adsorption capacity. The solubilizing medium may be added to the sorbent composition, but typically will be formed naturally during manufacture and/or storage and transport of the solid sorbent and/or the sorbent compositions.

The enhanced reaction and diffusional kinetics of the sorbent composition may enable coal-burning facilities (e.g., a coal-fired power plant) to rapidly and efficiently capture mercury to meet regulatory limits on mercury emissions. For example, the U.S. EPA MATS set mercury emission limits based on the amount of mercury per amount of power produced of 1.2 lb. Hg/Tbtu for coal-fired power plants combusting high rank coals (i.e., coals having >8,300 Btu/lb.) and of 4.0 lb. Hg/Tbtu for facilities combusting low rank coals (i.e., coals having <=8,300 Btu/lb.).

FIG. 1 is a flow sheet that illustrates an exemplary method for the manufacture of a sorbent composition in accordance with one embodiment, i.e., for the manufacture of a carbonaceous solid sorbent such as activated carbon and the addition of other components to form the sorbent composition. The manufacturing process may begin with a carbonaceous feedstock 101 such as low-rank lignite coal with a relatively high content of natural deposits of native minerals. In the manufacturing process, the feedstock 101 is subjected to an elevated temperature and one or more oxidizing gases under exothermic conditions for a period of time to increase surface area, create porosity, alter surface chemistry, and expose and exfoliate native minerals previously contained within feedstock. The specific steps in the process include: (1) dehydration 102, where the feedstock is heated to remove the free and bound water, typically occurring at temperatures ranging from 100-150° C.; (2) devolatilization 103, where free and weakly bound volatile organic constituents are removed, typically occurring at temperatures above 150° C.; (3) carbonization 104, where non-carbon elements continue to be removed and elemental (fixed) carbon is concentrated and transformed into random amorphous structures, typically occurring at temperatures around 350-800° C.; and (4) activation 105, where steam, air or another oxidizing agent is added and pores are developed, typically occurring at temperatures above 800° C. The manufacturing process may be carried out, for example, in a multi-hearth or rotary furnace. The manufacturing process is not discrete and steps can overlap and use various temperatures, gases and residence times within the ranges of each step to promote desired surface chemistry and physical characteristics of the manufactured product.

After activation 105, the thermally treated product (e.g., granular activated carbon) may be subjected to a comminution step 106 to reduce the particle size (e.g., the median particle size) of the product (e.g., to form powdered activated carbon). Comminution 106 may occur, for example, in a mill such as a roll mill, jet mill or other like device. Optionally, comminution 106 may be carried out for a time sufficient to reduce the median particle size of the thermally treated product, e.g., to not greater than about 100 micron, such as not greater than about 75 micron, such as not greater than about 50 micron, such as not greater than about 30 micron or even not greater than about 15 micron.

Advantageously, the sorbent composition may have a relatively high Hardgrove Grindability Index (HGI), as measured by ASTM Method D409. The HGI was developed to empirically measure the relative difficulty of grinding coal to the particle size necessary for complete combustion in a coal boiler furnace. The use of HGI has been extended to grinding coal for other purposes such as iron-making, cement manufacture and chemical industries utilizing coal. Particulate materials of low value HGI are more difficult to grind than those with high values. Mill capacity also falls when grinding materials with a lower HGI. In this regard, the HGI of the sorbent composition may be at least about 80 such as at least about 90, at least about 100 or even at least about 110. The relatively high HGI enables the average particle size to be reduced with relatively low energy consumption. Further, the relatively soft materials of the sorbent composition will lead to reduced erosion (e.g., attrition) of the comminuting equipment as compared to harder materials. While not wishing to be bound by any theory, it has been observed that utilizing lignite matter (e.g., lignite coal) feedstock will lead to a relatively high HGI.

In the event that manufacturing conditions result in a greater number of carbonaceous particles that have a very fine size than is desired, classification 107 may be carried out to remove such very fine particles from the larger carbonaceous particles. For example, classification 107 may be carried out using an air classifier, screen/mesh classification (e.g., vibrating screens) or centrifugation. Smaller particles may also be agglomerated to reduce the concentration of fine particles. The potential benefits of such a classification step are described in U.S. patent application Ser. No. 14/201,398 by McMurray et al., which is incorporated herein by reference in its entirety.

In accordance with the present disclosure, one or more dispersive agent(s) is included in the sorbent composition to improve the contaminant capture efficiency of the solid sorbent when introduced to the aqueous sorption liquid of the wet scrubber unit. In one characterization, the one or more dispersive agent(s) is provided as a component of the sorbent composition to increase the hydrophilic character of the solid sorbent surface and allow the sorbent composition to enter, disperse and remain suspended within the aqueous sorption liquid of a wet scrubber unit more easily than a solid sorbent lacking such a dispersive agent(s). Further, the dispersive agent(s) may reduce foaming at the interface of the liquid-air layer in the wet scrubber unit. The dispersive agent(s) may be any material that associates with the solid sorbent surface to enhance its hydrophilic character (e.g., to decrease its hydrophobic character) and enables better dispersion of the solid sorbent in the aqueous environment. Dispersive agents may include, as non-limiting examples, materials commonly referred to as dispersants, including polymeric dispersants, deflocculants, surfactants (e.g., wetting agents), emulsifying agents or emulsifiers, and/or coupling agents.

For example, the dispersive agent may be a dispersant i.e., a compound that improves the stability of particles in a liquid suspension by reducing the tendency of the solid sorbent particles to agglomerate and settle from the bulk of the sorption liquid. The dispersant compound may be a non-surface active compound or a surface active compound. Phalate esters such as polyvinyl chloride (PVC), polycarboxylate ether (PCE), or polycarboxylate (PC) may be utilized as dispersants. Useful dispersants may also include sulfonated naphthalene or sulfonated melamine. Other useful dispersants may include benzoates, terephthalates, esters, vegetable oils, sulfonamides, organophosphates, glycols/polyethers, and polybutene.

The dispersant may also be a compound that is commonly categorized as an emulsifier. Emulsifiers are substances that stabilize an emulsion by increasing kinetic stability of the mixture. Common examples of emulsifiers that may function as a dispersant for the solid sorbents include lecithin, mucilage, sodium stearoyl lactylate, diacetyl tartaric acid ester of monoglyeride (DATEM). Detergents may also be useful as a dispersant. Other examples of useful emulsifiers include emulsifying wax, certearyl alcohol, polysorbate 20 and ceteareth 20.

Polymeric dispersants are characterized as higher molecular weight polymer compounds comprised of polymer segments belonging to such groups as, but not limited to, polyurethanes, polyacrylates, polyethers, polyesters, and copolymers thereof. Polymeric dispersants may be either non-ionic or ionic in character, and function to stabilize particles in a liquid by steric stabilization, or by a combination of charge stabilization and steric stabilization. Polymeric dispersants may offer benefits such as versatility, thermal stability, electrolyte stability, stability under high shear conditions, and higher performance, even with a reduced concentration of dispersant.

The dispersive agent may also be a deflocculant. Deflocculants are chemical additives that reduce the settling of particles from a suspension. Deflocculants are typically low-molecular weight anionic polymers that neutralize positive charges on suspended particles, such as aryl-alkyl derivatives of sulfonic acids including polyphosphates, lignosulfonates, tannins, or water-soluble synthetic polymers. Examples of particular deflocculants that may be useful as a dispersive agent include polyphosphates, such as a sodium polyphosphates, such examples being tri-sodium phosphate (TSP, $Na_3PO_4$), or di-ammonium hydrogen phosphate (($NR_4$)$_2HPO_4$), or sodium hexametaphosphate ($Na_6P_6O_{18}$).

The dispersive agent may also be a surfactant. Surfactants, which are also known as wetting agents, lower the surface tension between the liquid and the solid, as in the case of a solid sorbent entering the aqueous phase of a wet scrubber unit. Surfactants may also reduce the surface tension at liquid-air interfaces, reducing the generation of foam. Surfactants may be categorized as detergents, emulsifiers, or defoamers. In general surfactants act to form a hydrophilic surface on an otherwise hydrophobic compound or particle. Examples include linear alkylbenzenesulfonates, lignin sulfonates, fatty alcohol ethoxylates, and alkylphenol ethoxylates. Surfactants may be fluorosurfactants, siloxane surfactants, and surfactants with polyether chains such as polyethylene and polypropylene oxides. Anionic surfactants may include sulfate, sulfonates, phosphates, and carboxylates, such as ammonium lauryl sulfate, or sodium lauryl sulfate, sodium stearate, sodium lauroyl sarcosinate, and caboxylated fluorosurfactants such as perfluorononanoate, or perfluorooctanoate. A surfactant may have a cationic head group such as pH-dependent primary, secondary, or tertiary amines or permanently charged quaternary ammonium cations such as cetyl trimethylammonium bromide. Further, zwitterionic or amphoteric surfactants have both cationic and anionic centers, the cationic part primarily based on primary, secondary, or tertiary amines, and the anionic part being more variable but often including sulfonates. Useful non-ionic surfactants may include fatty alcohols (e.g., ethoxylated fatty alcohols), cetyl alcohol, stearyl alcohols, cetostearyl alcohol, and oleyl alcohol.

The dispersive agent may also comprise a coupling agent. The coupling agents may act as a bridge that links a particle to the aqueous phase such as through covalent bonding, and/or through secondary interactions such as hydrogen bonding or ionic bonding. Examples of such hydrophilic coupling agents include epoxy, amine, hydroxyl, isocyanate, acrylic, mercapto, and phosphine functionalized silane and siloxane compounds.

In one particular embodiment, the dispersive agent comprises a polyphosphate, e.g., a phosphate salt. Phosphate salts function by reducing the charge density around agglomerates, creating smaller particulates that can be more readily dispersed in the aqueous sorption liquid. Phosphate salts may be particularly advantageous because phosphate salts tend to wet quickly, disperse well and are relatively inexpensive. Particularly useful phosphate salts include trisodium phosphate (TSP), di-ammonium hydrogenphosphate, and sodium hexametaphosphate Referring back to FIG. 1, one or more dispersive agents may be contacted with the activated carbon. For example, the dispersive agent(s) be in solution form may be contacted with the sorbent prior to 106A or after 106B comminution 106. In this regard, the dispersive agent may be coated on or impregnated in the solid sorbent prior to 106A or after 106B comminution 106, or may be admixed with the sorbent as dry agents either prior to 106A or after 106B comminution 106. For example, a dispersive agent (e.g., TSP), being for example solubilized in an aqueous solution, may be sprayed onto a sorbent such as PAC to form a sorbent composition comprising at least about 0.05 wt. % of the dispersive agent, or even at least 0.1 wt. % or greater of the dispersive agent. In one characterization, the sorbent composition comprises not greater than about 50 wt. % of the dispersive agent, such as not greater than about 20 wt. %, not greater than about 15 wt. % or even not greater than about 10 wt. % of the dispersive agent. It will be appreciated that the amount of dispersive agent should be sufficient to enable dispersion of the solid sorbent into the aqueous sorption liquid. As such, the sorbent composition may show an increased ability to enter and disperse within an aqueous sorption liquid within a wet scrubber unit as compared to untreated solid sorbents. For example, the wetting time of a sorbent composition including a dispersive agent as disclosed herein may be at least about 70%, at least about 74%, or even at least about 85% faster than the wetting time of the same solid sorbent that is not treated with a dispersive agent.

The sorbent composition disclosed herein may include other additives in addition to the dispersive agent. In one embodiment, the sorbent composition may include one or more of a capture agent(s) to facilitate the capture of contaminants from the aqueous sorption liquid in the wet scrubber unit. The capture agent(s) may be selected from an oxidant, chelating or bonding agent, precipitant, or metal species that facilitates the removal of mercury, bromide, selenium, arsenic, and/or nitrate from the aqueous sorption liquid within the wet scrubber unit. The capture agent may be used in combination with the dispersive agent.

Examples of useful capture agents that are categorized as oxidants (e.g., oxidative capture agents) include persulfates, such as ammonium persulfate or sodium persulfate, or peroxides such as hydrogen peroxide or potassium peroxymonosulfate. As such, ammonium persulfate (APS, $(NH_4)_2S_2O_8$) may be added to the aqueous sorption liquid of the wet scrubber unit such that bromide (Br) is oxidized to the larger bromate anion ($BrO_3^-$), which increases its sorbent capture potential according to the following reaction:

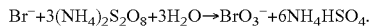

$$Br^- + 3(NH_4)_2S_2O_8 + 3H_2O \rightarrow BrO_3^- + 6NH_4HSO_4.$$

The capture agent may also be characterized as a chelating or bonding agent. Examples of useful chelating or bonding agents may include fly ash, inorganic sulfur compounds, chitosan and chitosan derivatives, crown ethers, cyclodextrins, ethylenediamine tetraacetic acid (EDTA), polymeric materials containing amine groups, iron compounds, sulfur compounds, and alumina.

The capture agent may also be a precipitant. Precipitants that may be useful as a capture agent include ionic compounds such as silver ions that have the ability to form cations in solution (e.g., in the aqueous sorption liquid) to bind the charged contaminant particles. For example, silver nitrate ($AgNO_3$) may form $Ag^+$ and $NO_3^-$ to bind to the negatively charged bromide ion (Br) to form AgBr which, due to its low solubility in water, may form a precipitate that can be readily separated from the aqueous sorption liquid of the wet scrubber unit either by deposition on the surface of the solid sorbent or as a self-contained solid.

The capture agent may also be a metal species. Metal species that may be useful as a capture agent include calcium or iron, and compounds containing calcium or iron may be utilized that are capable of reacting with Se and As, either in the zero valent form or as an oxidized species such as selenium oxide ($SeO_2$), selenite ($SeO_3^{2-}$) or selenate ($SeO_4^{2-}$), to complex with and remove Se from either the flue gas or from the aqueous sorption liquid of the wet scrubber unit, via adsorption by the sorbent or by precipitation.

In a manner similar to the dispersive agent(s), the capture agent(s) may be added in to the sorbent in the form of a solution (e.g., sprayed on or slurried with the sorbent) to coat and/or impregnate the solid sorbent with the capture agent prior to 106A or after 106B comminution 106, or may be admixed with the sorbent as dry agents either prior to 106A or after 106B comminution 106. The capture agent(s) may optionally associate with the solid sorbent of the sorbent composition either prior to, or following, the capture of one or more contaminant species. As a non-limiting example, a silver nitrate solution may be sprayed onto granular activated carbon (GAC) before comminution 106A, or alternately onto the PAC that is created by the comminution step 106, as in step 106B. Alternately, substantially dry silver nitrate may be dry mixed with GAC and milled to form a PAC-silver nitrate mixture of appropriate particle size. Further, the dry silver nitrate may be ground to an appropriate size and admixed with PAC after comminution as in step 106B.

Figure 2:
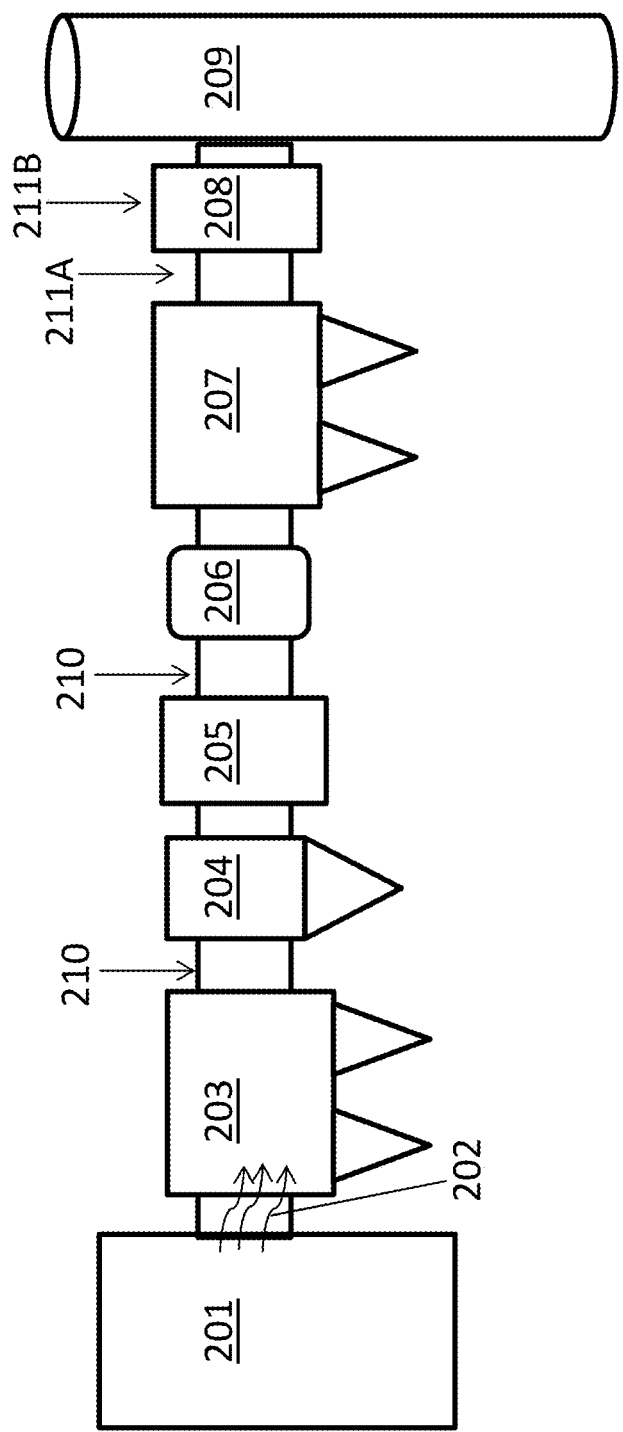
FIG. 2 schematically illustrates an exemplary plant configuration and method for the capture and sequestration of mercury from a flue gas stream.

FIG. 2 schematically illustrates a sample flue gas stream emission control system (i.e., a flue gas treatment train) that may be utilized at an electricity generating unit (EGU) or industrial boiler site. Components of the system may include a bag house (i.e., a fabric filter), electrostatic precipitator (ESP), an air heater (AH), wet flue gas desulfurization (wFGD) or wet scrubber unit, and/or a selective catalytic reactor (SCR). The plant's boiler 201 produces a flue gas stream 202. The flue gas stream may flow through a through an SCR 203, hot-side ESP 204, AH 205, bag house (BH) 206, cold side ESP 207, then through a wet-Flue Gas Desulfurization (wFGD)/$SO_2$ scrubber, also called a wet scrubber unit 208, and then out through the stack 209. PAC may be injected at various points to be either entrained in the flue gas stream 210, e.g., added upstream 211A of and/or directly to 211B the wet scrubber unit.

It should be understood that various operations are possible and that the sorbent compositions disclosed herein are particularly well suited for use in flue gas treatment systems with a wet scrubber unit 208, in that the sorbent compositions may have increased ability to enter an aqueous sorption liquid in the wet scrubber unit along with other characteristics favorable to mercury, selenium, arsenic, nitrate, and bromide contact, capture, and/or conversion which aid in contaminant removal from the aqueous sorption liquid. A sorbent composition that is specially designed to enter the aqueous sorption liquid in the wet scrubber unit may be added to a flue gas stream at point 211A, i.e., before the flue gas enters the wet scrubber unit 208. Alternately, the sorbent composition may be added directly to the wet scrubber unit 208, such as at point 211B. Methods for use of a sorbent in a wet scrubber unit have been described before such as in U.S. Pat. No. 7,722,843 to Srinivasachar and U.S. Pat. No. 7,727,307 to Winkler, each of which is incorporated herein by reference in its entirety.

Although the additives disclosed herein (e.g., the dispersive agent, the capture agent, or other additives) may be combined with the solid sorbent prior to contacting the sorbent composition with the aqueous sorption liquid, e.g., by admixing with or coating the additives with or onto the solid sorbent, the additives may also be added to the aqueous sorption liquid separate from the sorbent. That is, a solid sorbent (e.g., activated carbon) may be added directly to the aqueous sorption liquid in the wet scrubber unit while other additives, such as the dispersive agent, are separately added to the aqueous sorption liquid. In one characterization, the dispersive agent is coated onto the solid sorbent and another agent, such as a capture agent, is added separately to the aqueous sorption liquid.

Figure 3:
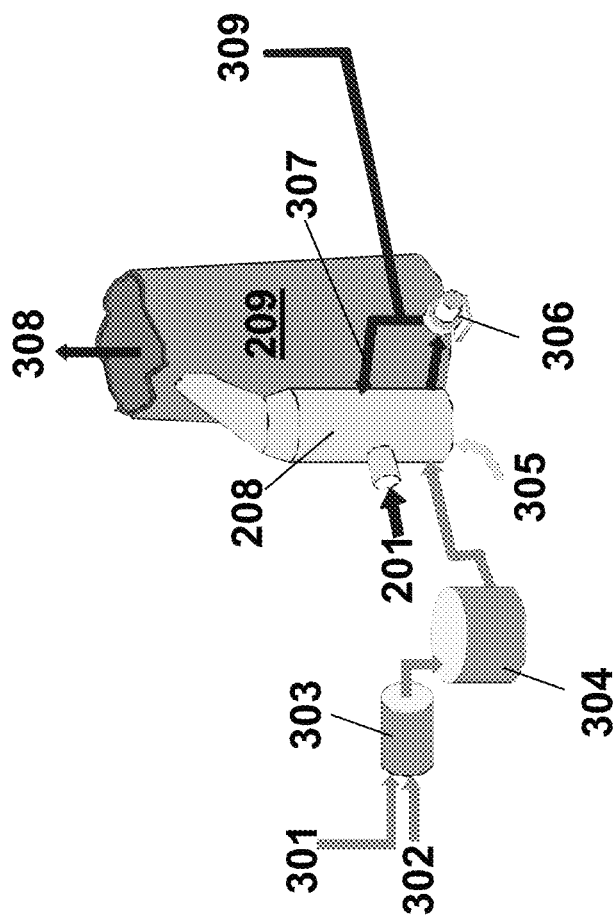
FIG. 3 schematically illustrates an exemplary wet scrubber unit operation.

FIG. 3 illustrates processes related to the operation of a wet scrubber unit 208. Limestone 301, being calcium carbonate, is mixed with water 302 and is ground in a tank 303, to form an aqueous sorption liquid (e.g., a slurry) that enters a limestone slurry tank 304 that feeds the wet scrubber unit 208. Compressed air 305 is fed up through the bottom of the wet scrubber unit 208. Solid-liquid slurry (e.g., waste sorption liquid or effluent) is removed via pump 306 from the bottom of the wet scrubber unit 208 and filtered, and the water filtrate is returned 307 to the wet scrubber unit 208. Flue gas enters the wet scrubber unit 208 from the flue gas stream 201. Scrubbed or clean gas then exits to the stack 209 wherein it is released to the atmosphere 308. The solids 309, being limestone and particulate matter from the flue gas stream such as fly ash, are separated from the waste sorption liquid and may be sold as a gypsum product. A sorbent composition that may be specially designed to disperse in the aqueous sorption liquid may, as is discussed above, enter the wet scrubber unit 208 with the flue gas stream 201. Alternatively, the sorbent composition may be fed into the wet scrubber unit 208 directly such as by mixing the sorbent composition with the other components in the slurry tank 304.

The solid sorbent (e.g., PAC), may remove mercury from the wet scrubber unit (i.e., from the aqueous sorption liquid) by adsorption. This requires oxidation of the mercury, which drives the mercury into the liquid phase so that it can be captured by the PAC in the liquid. Since PAC has a high affinity for oxidized mercury and captures it in stable form in the pore structure, it is an ideal adsorbent.

Figure 4:
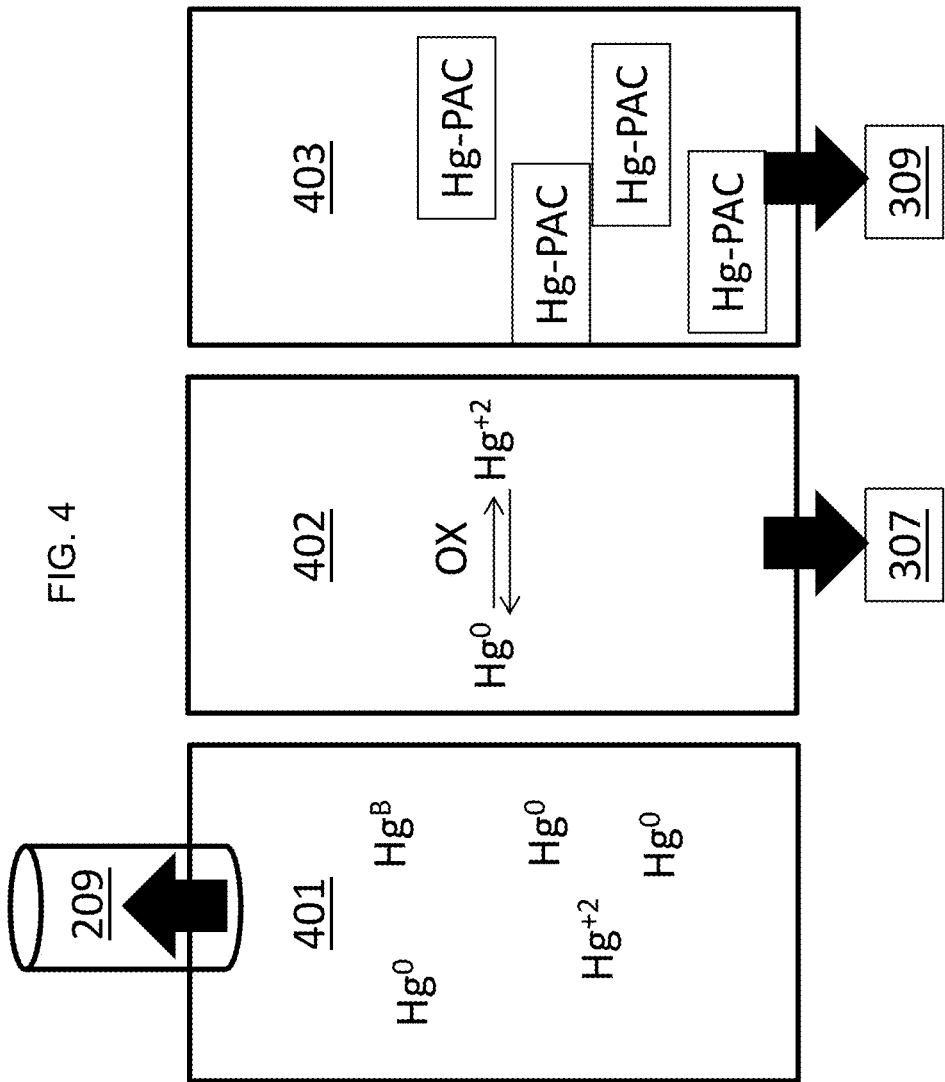
FIG. 4 schematically illustrates mercury oxidation and capture in a wet scrubber unit.

FIG. 4 schematically illustrates a PAC mercury adsorption process in a wet scrubber unit. In a wet scrubber unit, mercury may stay entrained in the flue gas 401, be in solution 402 or be bound to solids 403, mainly PAC. In the flue gas 401 mercury exists as a combination of elemental ($Hg^0$), oxidized ($Hg^{+2}$) and particulate phase mercury ($Hg^B$), i.e., elemental and/or oxidized mercury associated with a solid particle entrained in the flue gas. Because the flue gas may have low native oxidation, the predominant form is naturally elemental, gaseous mercury ($Hg^0$). Typically, only small amounts are oxidized ($Hg^{+2}$) or in particulate form with no mercury control reagents. When the flue gas is scrubbed with calcium carbonate and water 402, a mixture of mercury species may be present in the gas/liquid interface and in the liquid/solid sorbent interface. The mercury molecules transport through the phases within the scrubber. An oxidant may be used to oxidize the elemental species to oxidized species which are easily bound by the PAC 403. The PAC is then removed from the system with the slurry solids 309. Elemental mercury formed in the slurry liquid 307 may be recycled back to the scrubber or may diffuse back into the gas phase and ultimately will be re-emitted back into the flue gas 401 and escape through the stack 209. With a sorbent composition that is able to be well dispersed in the aqueous liquid phase of the wet scrubber unit, improved mercury capture is possible.

The median particle size of a particle size distribution (PSD) is commonly referred to as the D50. When particles of a given size distribution are dispersed into a liquid phase such as water, the primary particles comprising the distribution may exhibit agglomeration wherein primary particles associate with each other leading to the formation of larger aggregates. The formation of aggregates during particle dispersion typically promotes faster gravity settling and concomitant reduction in dispersion efficiency. Analysis of the particle size distribution measured directly on the liquid phase dispersion of the particles will yield information pertaining to the extent of any particle agglomeration. Dispersive agents described herein may, for example, reduce or even eliminate agglomeration of sorbent particles. Median particle size and PSD of the sorbent compositions can be measured, for example, by using a Micrometrics Saturn DigiSizer II (Micrometrics Instrument Corporation, Norcross, Ga.), which is a high-definition digital particle size analyzer. This instrument employs a light scattering analysis technique that utilizes advanced digital detection technology.

To assess the ability of sorbent compositions to disperse into an aqueous phase of a wet scrubber unit, wetting time of the sorbent compositions can be measured in a wetting test. For this test, a given amount of each sample sorbent composition is added to a predetermined level of water (represented here by an aqueous sorption liquid sample from an operational wet scrubber unit). The time required for the sample sorbent composition to wet and completely enter the aqueous phase, i.e., when substantially all of the sorbent composition leaves the aqueous/air interface and fully enters the aqueous phase, becoming completely immersed, is observed visually and recorded. The test is performed at about 20° C.

Utilizing such a test, it has been found that a sorbent composition as disclosed herein (e.g., including an effective amount of a dispersive agent) may enter an aqueous sorption liquid of a wet scrubber unit much faster than the untreated solid sorbent (i.e., the same solid sorbent without a dispersive agent). In one characterization, the time needed for the sorbent composition to enter an aqueous sorption liquid is not greater than about 90% of the time needed for the untreated solid sorbent to enter the aqueous sorption liquid, such as not greater than about 70% of the time needed for the untreated solid sorbent to enter the aqueous sorption liquid, or even not greater than about 50% of the time needed for the untreated solid sorbent to enter the aqueous sorption liquid.

To determine the stability of a dispersion of the sample sorbent compositions, the time required for the sample sorbent compositions to gravity settle from a fully homogenized dispersion can be measured in a comparative settling test. The greater the amount of time required for the well-dispersed sample sorbent compositions to settle from the aqueous phase, the higher the stability of the dispersion and the more effective the sorbent composition for contacting and sequestering the contaminant species.

The sorbent compositions disclosed herein may show increased ability to remove bromine/bromide from the aqueous sorption liquid of a wet scrubber unit as compared to untreated solid sorbents (i.e., without a capture agent). For example, the sorbent compositions of the present disclosure may have at least about a 50% increase, or even at least about a 60% increase, or even at least about a 70% increase, or even at least about an 80% increase, or even at least about a 90% increase, or even at least about a 95% increase in the ability to remove bromine/bromide from the aqueous sorption liquid as compared to untreated solid sorbents.

EXAMPLES

Example 1

Example 1 illustrates the ability of sample sorbent compositions to enter the aqueous sorption liquid of a wet scrubber unit by use of a wetting test as described above. For this test, aqueous sorption liquid samples from two separate industrial sites were taken, one being the aqueous phase of the scrubber slurry, obtained by filtering out the solids, and the second being an aqueous sample from the effluent. The comparative Sample A sorbent composition is a prior art sorbent, namely PowerPAC® (ADA Carbon Solutions, Littleton, Colo.), having no additional treatment or additive. PowerPAC® is an activated carbon sorbent with a median particle size of about 25 micron, a fixed carbon content of about 50 wt. %, mineral content of about 40 wt. %, and sum micropore and mesopore volume of 0.25 cc/g. Sample B is prepared by spraying an aqueous solution of tri-sodium phosphate, TSP, ($Na_3PO_4$) onto Sample A to yield a 0.1 wt. % concentration of TSP on the sorbent. To determine the ease of wetting and dispersion of the samples, a 5 g aliquot of each of Sample A and B is added to 500 ml of the aqueous test solution at a temperature of 20° C. with no agitation.

For comparative Sample A, complete wetting or entry time into the aqueous liquid is about 90 min, whereas for Sample B complete wetting time is about 10 min, indicating an 89% improvement in wetting time, i.e., the time needed for the Sample B sorbent composition to enter the aqueous sorption liquid is about 11% of the time needed for the untreated solid sorbent to enter the aqueous sorption liquid. In a repeat test using an aqueous sorbent liquid from a different scrubber unit, Sample A wetting time is about 35 min, whereas Sample B wetting time is about 9 min, indicating a 74% improvement in wetting time, i.e., the time needed for the Sample B sorbent composition to enter the aqueous sorption liquid is about 26% of the time needed for the untreated solid sorbent to enter the aqueous sorption liquid.

Example 2

Figure 5A:
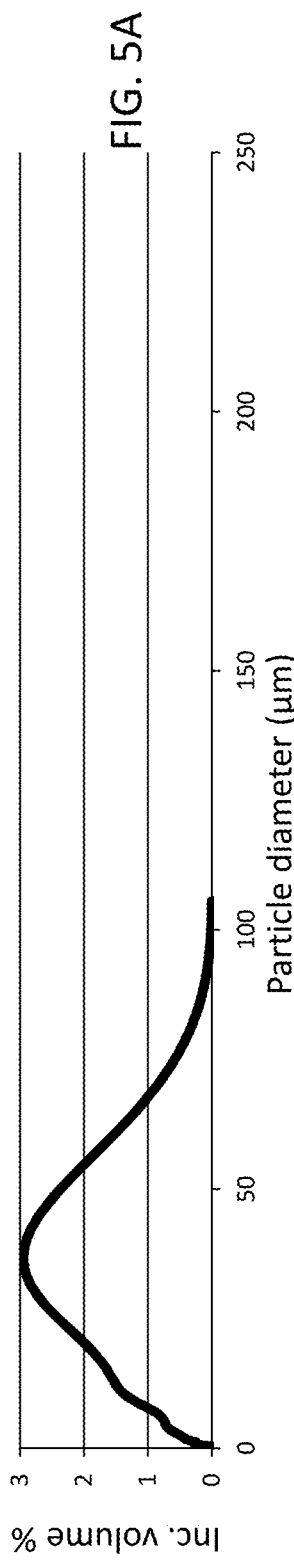
FIG. 5A is a particle diameter graph illustrating the particle size distribution of comparative prior art Sample A measured as dry powder.
Figure 5B:
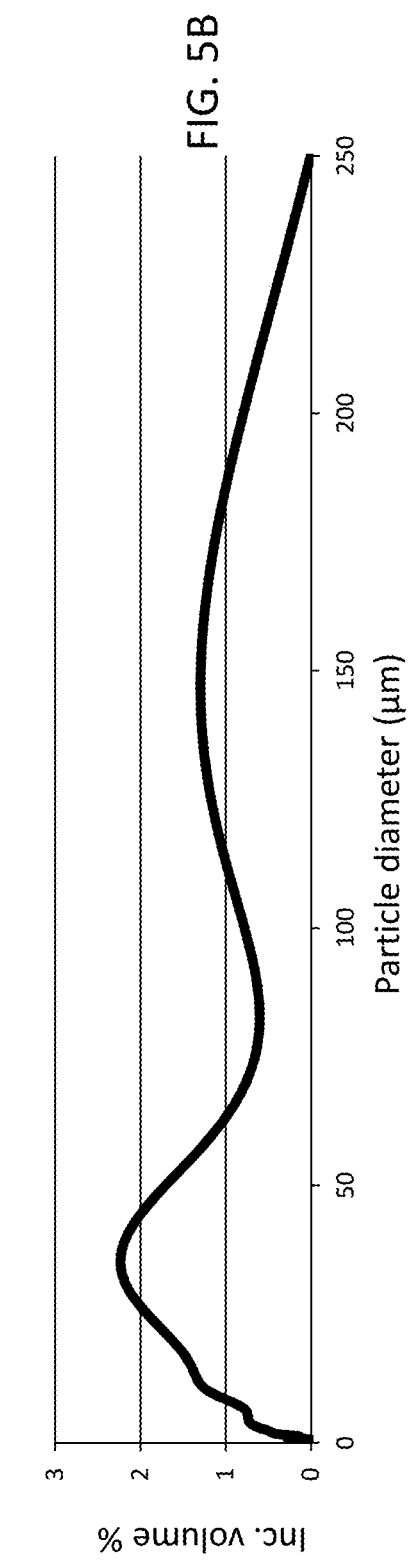
FIG. 5B is a particle diameter graph illustrating the particle size distribution of comparative prior art Sample A, measured in aqueous dispersion.

The particle size distributions (PSD) of comparative Sample A (described above) and a Sample C are measured under dry conditions and upon dispersion, and are compared to illustrate the degree of particle agglomeration upon aqueous dispersion. To create Sample C, a solution of TSP (tri-sodium phosphate, $Na_3PO_4$) is sprayed onto comparative Sample A to give a 5 wt. % concentration of TSP on the solid sorbent. FIG. 5A illustrates PSD scan results for comparative Sample A under dry powder conditions, wherein the D50 is measured to be 21.7 micron. FIG. 5B illustrates PSD scan results for comparative Sample A following dispersion in deionized water. The D50 of comparative Sample A is observed to increase to 26 micron following aqueous dispersion, and a substantial increase in the number of particles (i.e., aggregates) above 100 micron in size is observed, indicating substantial particle agglomeration following aqueous dispersion.

Figure 5C:
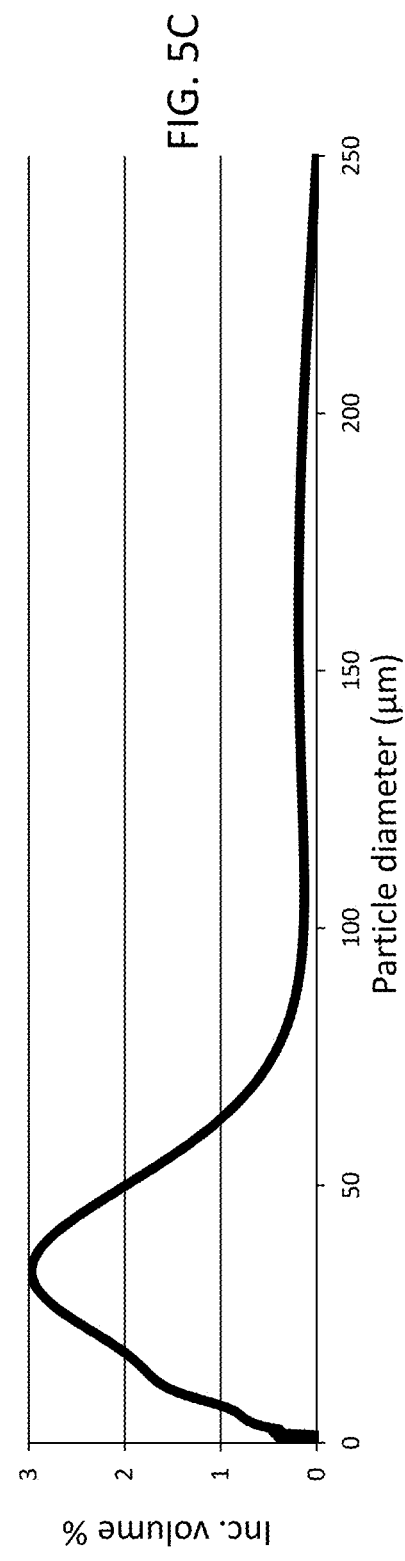
FIG. 5C is a particle diameter graph illustrating the particle size distribution of sorbent Sample C, measured in aqueous dispersion.

FIG. 5C illustrates the aqueous phase PSD scan results from Sample C. Because Sample C was formed from Sample A, it has the same dry PSD of 21.7 micron. The D50 of Sample C is measured to be 21.9 micron following dispersion in water, which is very close to the D50 of the dry material. In addition, as seen in FIG. 5C, there are very few particles (i.e., aggregates) greater than 100 micron in size in the aqueous dispersed Sample C, indicating that the solid sorbent particles of Sample C do not agglomerate appreciably when dispersed in water and as such yield a more stable and effective dispersion.

Example 3

To test the stability of aqueous dispersions of the sample sorbent compositions, a comparative settling test is performed as is described above. For this test, 5 g of each of comparative Sample A and Sample C is poured onto the surface of 500 ml of an aqueous sorbent liquid from a wet scrubber unit contained in a beaker. After each sample is completely wetted, both beakers are put in a jar tester. The mixing blade of the jar tester is set at 60 rpm to disperse the carbon in the test solution for 5 min. The blade is then stopped and the sample visually observed. A timer is used to measure the time needed for the samples to settle on the bottom. Comparative Sample A settles to the bottom in about 5 min, whereas Sample C settles to the bottom in about 9 min indicating better dispersive qualities or suspension characteristics of Sample C in an aqueous environment.

Example 4

A beta test is a full-scale evaluation of a sample's efficacy at a coal-burning power plant. To test the effectiveness of mercury capture in a plant's wet scrubber unit, or wFGD, an example sorbent composition, Sample F, is used in an EGU. Sample F is created by spraying a TSP solution onto Sample A above, to a dry TSP concentration of 0.1 wt. %.

This EGU is greater than 500 MW and fires coal. Referencing FIG. 2, the emission control system of the unit includes and is configured in the sequence of a boiler 201, hot-side ESP 204, air pre-heater (AH) 205, two wet scrubber units 208, and stack 209. The station burns a low-sulfur and high volatile content coal, with a heating value above 10,000 Btu/lb. Standard ASTM methods are used to analyze a sample of the coal's minerals and trace elements. The average dry sulfur content of the coal is 0.7 wt. % as measured by ASTM Method D 4239. Trace element analysis reveals that the coal contains less than 20 μg/g bromine (ASTM D 4208-Br), 15-23 μg/g chlorine (ASTM D 6721), 1-5 µg/g arsenic (ASTM D 3684/6357), 1-2 µg/g selenium (ASTM D 3684/6357), and 0.02-0.09 µg/g mercury (ASTM D 6722).

Figure 6:
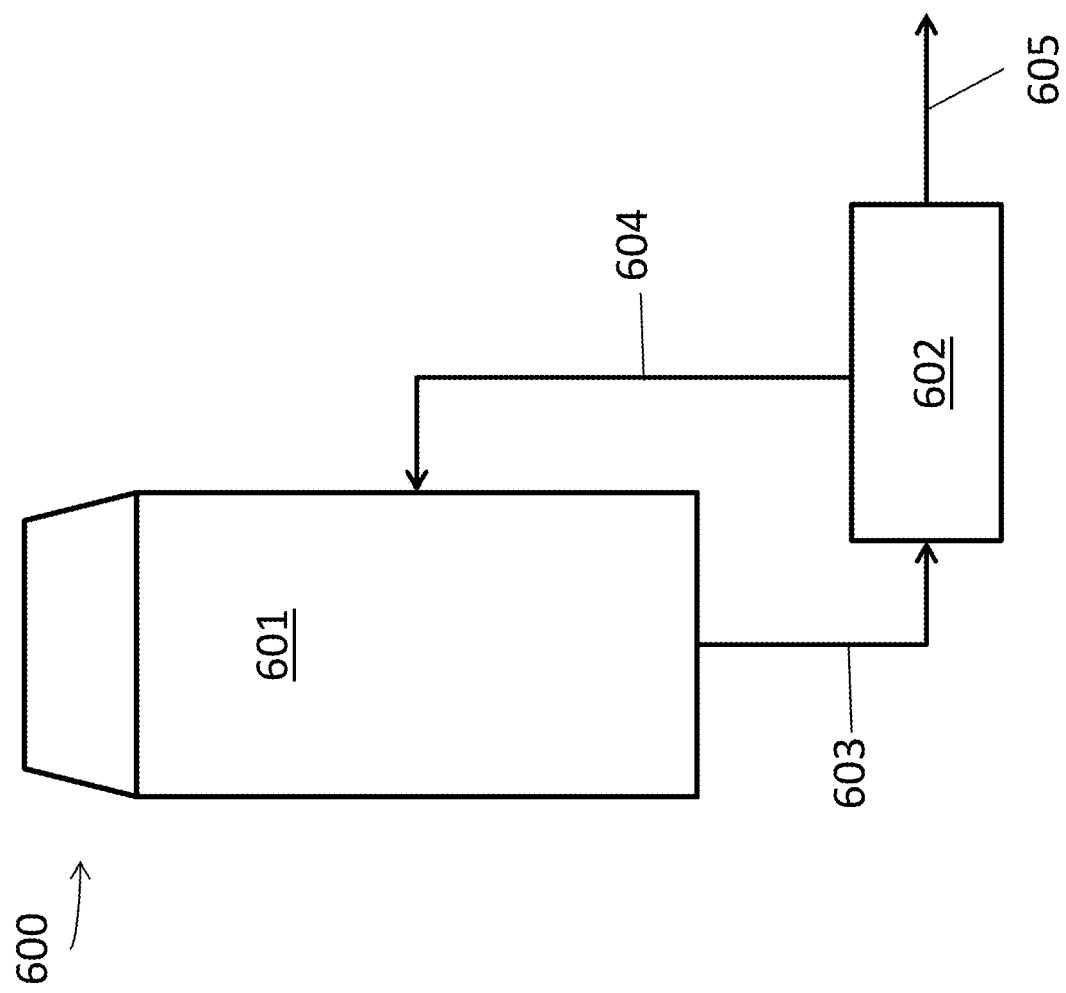
FIG. 6 schematically illustrates an exemplary open spray tower scrubber unit.

At this site, two wet scrubber units 208 are used per unit. The scrubbers are open spray tower units, such as those that are schematically illustrated in FIG. 6. Each scrubber 600 is equipped with a primary vessel 601 and one primary dewatering system, which consists of one bank of three hydrocyclones 602 with associated piping and valves. The capacity of each primary vessel is about 900,000 gallons (gal), and the operating liquid volume is approximately 750,000 gal. Slurry 603 from the bleed slurry circuit is pumped to the primary dewatering hydrocyclone bank 602, and then the bleed slurry is directed to two dewatering cyclones. The primary cyclones separate the slurry into two streams: overflow 604, or recirculated liquid, as in FIG. 3 (307), with approximately 5% solid concentration, and underflow 605, or solids, as in FIG. 3 (309), with approximately 50% solid concentration. The 5% slurry stream overflow 604 is routed to the hydrocyclone overflow tank and is pumped back to the primary vessel 601. The underflow stream 605 (50% solid concentration) flows through the second dewatering system and goes to belt filters where gypsum is separated.

The purpose of the beta tests is to demonstrate options for MATS compliance with the 1.2 lb/Tbtu mercury emission limit (30-day rolling average basis). In this example, the mercury in the boiler is oxidized using a calcium bromide ($CaBr_2$) coal additive and the Sample F sorbent composition is injected into the aqueous sorption liquid of a wet scrubber unit. The example sorbent composition is slurried as described below and added into the wet scrubber unit recycle loop. Tests are conducted over a period of several months.

In tests, a solution of calcium bromide is applied continuously to the coal. The Sample F sorbent composition is introduced to the aqueous sorption liquid of a wet scrubber unit at concentrations of 0 (i.e., $CaBr_2$ addition to the coal only), a 1× addition of the Sample F sorbent composition to the absorber, and a 2× addition of the Sample F sorbent composition (i.e., approximately twice as much sorbent composition as in the 1× example). The sorbent composition is added into the scrubber absorber primary vessel after slurrying the sorbent composition in recycled scrubber liquid. The sorbent composition is introduced intermittently by dosing the slurry into the wet scrubber unit vessel to maintain the desired 1× or 2× sorbent composition dosage. This dosing is manual, typically occurring once or twice a day, for a timed period of injection.

Mercury levels at the gas exit of the wFGD or the entrance to the stack are monitored using ASTM Method 30 B non-speciated traps. Traps are typically changed out twice weekly, and sometimes more frequently depending on operational events. The operation of the wet scrubber unit includes a continuous blowdown of slurry liquid and solids, recycle of liquid overflow, sorbent composition addition intervals and continuous make-up water. A concentration of Sample F sorbent composition is initially dosed to a concentration higher than the desired concentration in the absorber, but is depleted and made-up through the daily operation to reach a steady state. Full sorbent composition and Hg mass balances are not obtained, but characterization of key streams is achieved.

In order to establish injection rates into the wet scrubber unit for both initial dosing and maintenance of a consistent sorbent composition level, a rough flow and mass rate balance is calculated around the scrubber. Concentrations of 1× and 2× of the Sample F sorbent composition are targeted in the wet scrubber unit for an initial dosage of the sorbent composition, and the addition of the sorbent composition is then done in a daily dose that is timed by an operator of the injection system. The manual addition of the sorbent composition is timed rather than weighed, so the relative concentration levels are approximate.

Figure 7A:
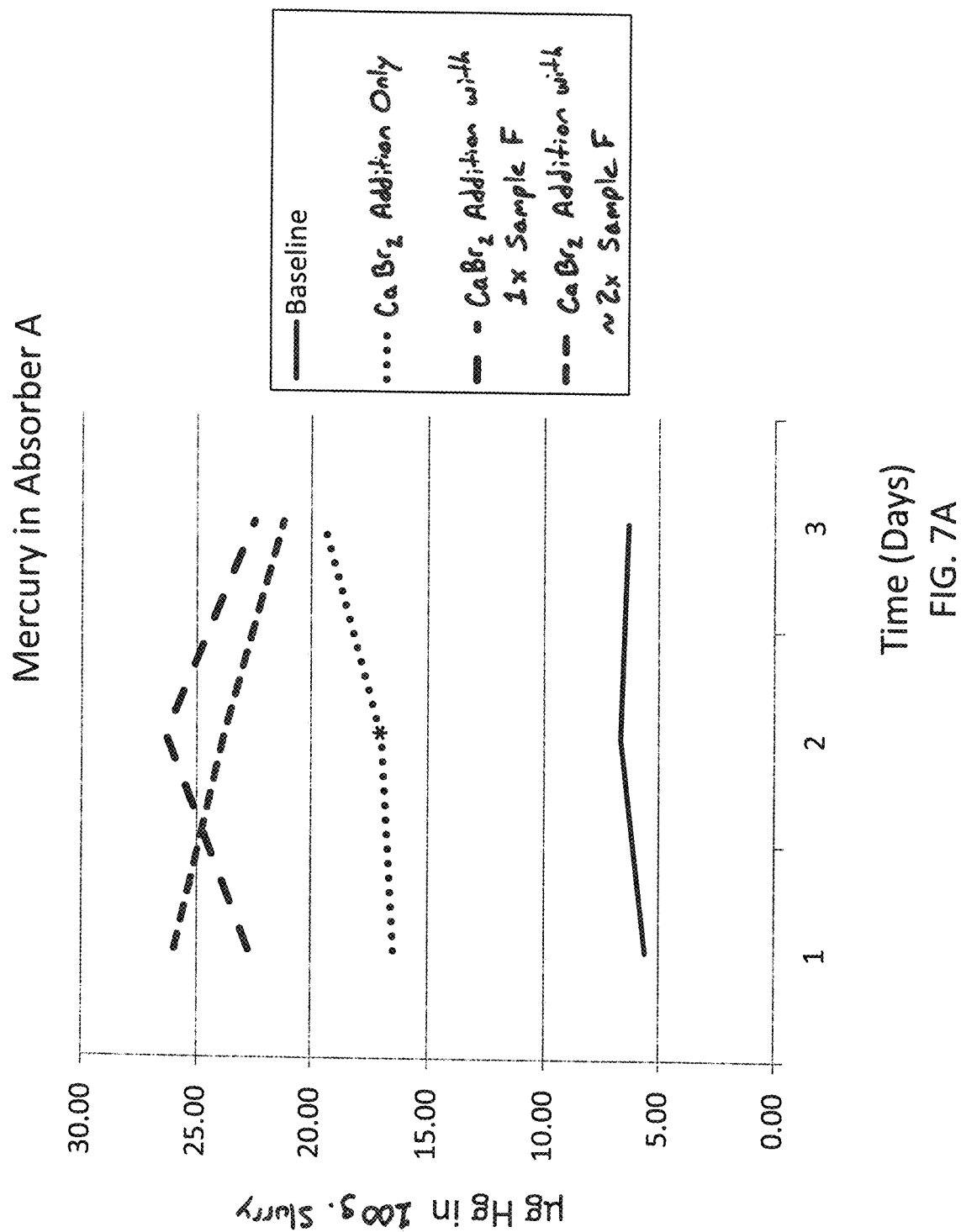
FIG. 7A is a graph illustrating amount of mercury associated with solids in a scrubber as a function of time.
Figure 7B:
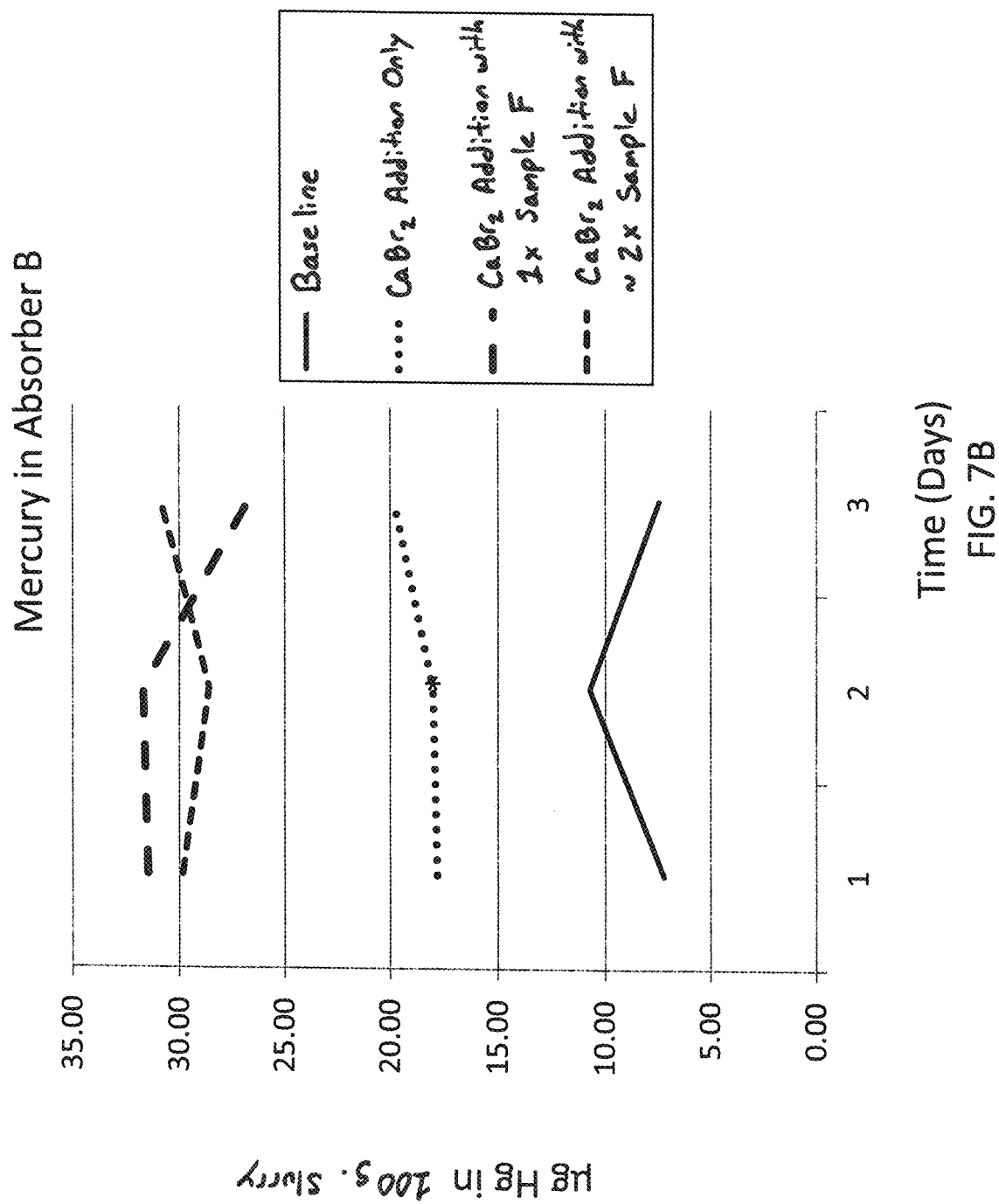
FIG. 7B is a graph illustrating amount of mercury associated with solids in a scrubber as a function of time.

Samples of the first unit's vessel slurry are taken during various conditions over an extended period. The slurry samples are analyzed for mercury content and the results are illustrated in FIGS. 7A and 7B. FIGS. 7A and 7B show both the mercury content of wet scrubber unit solids in two different absorbers, A and B, respectively. The wet scrubber unit solids generally include mainly calcium sulfate hydrate (synthetic gypsum). In all cases the mercury content in the liquid is very low, indicating that all mercury was either in the solid or gaseous phase. The increase in mercury content in the scrubber solids from baseline to $CaBr_2$ addition alone and then with addition of the sorbent composition to the scrubber is a reflection of mercury transporting from the flue gas to the liquid phase and then to the solids as seen in FIG. 4. The solid phase mercury amount includes the capture by the Sample F sorbent composition. Referring back to FIGS. 7A and 7B, at baseline conditions, represented by the solid line, with no reagents added to the absorbers, solid phase mercury concentration measures approximately 5-10 µg Hg/100 g slurry. Once the flue gas mercury is oxidized through the addition of calcium bromide to the coal, represented by the dotted line, improved transport of the (oxidized) mercury into the liquid phase is enabled, and this level increases to about 15-20 µg Hg/100 g slurry, indicating an improvement in mercury control (the balance of mercury will go out with the flue gas). The point represented by the asterisk is an extrapolated point. With addition of the Sample F sorbent composition to the scrubber, represented by the dashed lines, the solids mercury level increases (about 22-32 µg Hg/100 g slurry). Addition of the calcium bromide oxidant increases Hg associated with the solids, however addition of Sample F sorbent may increase the Hg associated with the solids by almost two fold, as seen in FIG. 7B.

Figure 8:
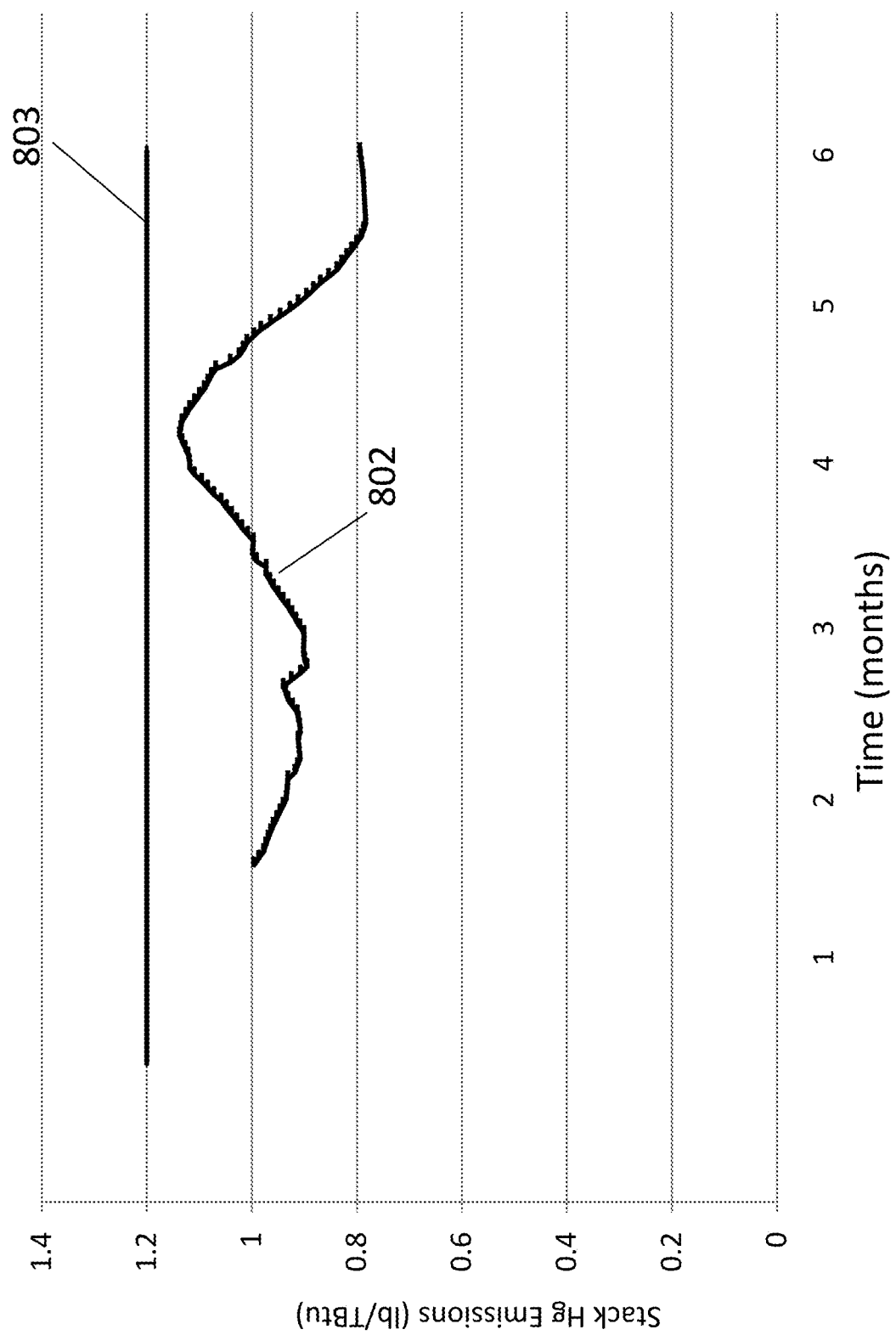
FIG. 8 is a graph illustrating mercury emission from a stack in a beta-test conducted over several months.

The wet scrubber unit of the plant described above, is operated with a combination of $CaBr_2$ feed onto the coal and addition of Sample F sorbent composition into the absorber vessel for six months. The mercury levels in the flue gas at the stack, once Sample F was introduced, are depicted on FIG. 8. Prior to introduction of Sample F, flue gas mercury (trap) levels of about 3.6 lb/Tbtu were measured. The 30-day rolling average of total stack mercury is shown by line 802, compared to the MATS limit of 1.2 lb/Tbtu mercury shown by line 803. Over time the rolling average amount of mercury 802 drops, increases, and drops again, however this average remains consistently below the MATS limit of 1.2 lb/TBtu 803. Further, no unusual foaming issues were observed during the testing period. These tests indicated that the Sample F sorbent composition was an effective sorbent composition, with good wetting and dispersion characteristics leading to consistent mercury capture meeting the MATS limit of 1.2 lb/TBtu over time.

While various embodiments of the present disclosure have been described in detail, it is apparent that modifications and adaptations of those embodiments will occur to those skilled in the art. However, is to be expressly understood that such modifications and adaptations are within the spirit and scope of the present disclosure.

What is claimed is:

1. A method of manufacture of a sorbent composition comprising:

providing a carbonaceous solid sorbent comprising activated carbon;
contacting the carbonaceous solid sorbent with one or more dispersive agents; and
contacting the carbonaceous solid sorbent with an alkaline compound.

2. The method of claim 1, wherein the contacting comprises spraying an aqueous solution comprising the one or more dispersive agents onto the carbonaceous solid sorbent.

3. The method of claim 1, wherein the contacting comprises mixing the one or more dispersive agents in the form of dry agents with the carbonaceous solid sorbent.

4. The method of claim 1, wherein the one or more dispersive agents are selected from the group consisting of dispersants, deflocculants, surfactants, coupling agents, and combinations thereof.

5. The method of claim 1, wherein the one or more dispersive agents comprises a polymeric dispersant, and wherein the alkaline compound comprises limestone.

6. The method of claim 1, wherein the one or more dispersive agents comprises a phosphate salt.

7. The method of claim 6, wherein the phosphate salt comprises tri-sodium phosphate.

8. The method of claim 7, wherein the sorbent composition comprises an amount of at least about 0.05 wt. % of the tri-sodium phosphate.

9. The method of claim 7, wherein the tri-sodium phosphate is coated on the carbonaceous solid sorbent.

10. The method of claim 1, further comprising:
contacting the sorbent composition with a capture agent.

11. The method of claim 10, wherein the capture agent is selected from the group consisting of peroxides, persulfates, silver compounds, and combinations thereof.

12. The method of claim 11, wherein the capture agent comprises ammonium persulfate.

13. The method of claim 11, wherein the capture agent comprises silver nitrate.

14. The method of claim 10, where the capture agent comprises a metal or a metal-containing compound, wherein the metal is selected from the group consisting of calcium, iron, and mixtures thereof.

15. The method of claim 1, wherein the activated carbon has a median particle size of not greater than about 100 micron and a sum of micropore volume plus mesopore volume of at least about 0.20 cc/g.

16. The method of claim 15, wherein the activated carbon has a median particle size of not greater than about 30 micron.

17. The method of claim 15, wherein the activated carbon has a ratio of micropore volume to mesopore volume of at least 0.7 and no greater than 1.5.

18. A method of manufacture of a sorbent composition comprising:
providing a carbonaceous solid sorbent comprising activated carbon having a median particle size of not greater than about 100 micron and a sum of micropore volume plus mesopore volume of at least about 0.20 cc/g;
contacting the carbonaceous solid sorbent with one or more dispersive agents; and
contacting the carbonaceous solid sorbent with an alkaline compound.

19. The method of claim 18, wherein the one or more dispersive agents are selected from the group consisting of dispersants, deflocculants, surfactants, coupling agents, and combinations thereof.

20. The method of claim 19, wherein the one or more dispersive agents comprises a phosphate salt, and wherein the alkaline compound comprises limestone.

21. The method of claim 20, wherein the one or more dispersive agents comprises tri-sodium phosphate in an amount of at least about 0.05 wt. % of the sorbent composition.

22. The method of claim 18, further comprising:
contacting the sorbent composition with a capture agent selected from the group consisting of peroxides, persulfates, silver compounds, calcium compounds, iron compounds, and combinations thereof.

23. A method of manufacture of a sorbent composition comprising:
providing a carbonaceous solid sorbent comprising activated carbon;
contacting the carbonaceous solid sorbent with one or more dispersive agents and with one or more capture agents; and
contacting the carbonaceous solid sorbent with an alkaline compound,
wherein the one or more dispersive agents are selected from the group consisting of dispersants, deflocculants, coupling agents, and combinations thereof, and
wherein the one or more capture agents includes a peroxide.

24. The method of claim 23, wherein the activated carbon has a median particle size of not greater than about 100 micron and a sum of micropore volume plus mesopore volume of at least 0.20 cc/g, and wherein the alkaline compound comprises limestone.

* * * * *